(12) United States Patent
Swilling

(10) Patent No.: US 9,586,316 B1
(45) Date of Patent: Mar. 7, 2017

(54) DETERMINATION OF ROBOTIC STEP PATH

(71) Applicant: Google Inc., Mountain View, CA (US)

(72) Inventor: Benjamin Swilling, Waltham, MA (US)

(73) Assignee: Google Inc., Mountain View, CA (US)

( * ) Notice: Subject to any disclaimer, the term of this patent is extended or adjusted under 35 U.S.C. 154(b) by 36 days.

(21) Appl. No.: 14/855,045

(22) Filed: Sep. 15, 2015

(51) Int. Cl.
| G05B 19/04 | (2006.01) |
| G05B 19/18 | (2006.01) |
| B25J 9/16  | (2006.01) |
| B62D 57/032| (2006.01) |

(52) U.S. Cl.
CPC .......... *B25J 9/1664* (2013.01); *B62D 57/032* (2013.01); *Y10S 901/01* (2013.01); *Y10S 901/46* (2013.01)

(58) Field of Classification Search
CPC ........ B25J 9/162; B25J 9/1664; B25J 9/1676; B25J 9/1648; B25J 9/1628; B25J 9/1638; B25J 9/1674; B25J 9/1697; B60D 57/032; B60D 57/00; B60D 57/02; Y10S 901/01; Y10S 901/02; Y10S 901/46; Y10S 901/28; Y10S 901/49
See application file for complete search history.

(56) References Cited

U.S. PATENT DOCUMENTS

| 4,834,200 A | 5/1989 | Kajita |
| 5,151,859 A | 9/1992 | Yoshino et al. |
| 5,355,064 A | 10/1994 | Yoshino et al. |
| 5,416,393 A | 5/1995 | Gomi et al. |
| 5,432,417 A * | 7/1995 | Takenaka ............. B62D 57/032 180/8.6 |
| 5,459,659 A | 10/1995 | Takenaka |

(Continued)

FOREIGN PATENT DOCUMENTS

KR    100815247    3/2008

OTHER PUBLICATIONS

Bajracharya, et al., "High fidelity day/night stereo mapping with vegetation and negative obstacle detection for vision-in-the-loop walking," 2013 IEEE/RSJ International Conference on Intelligent Robots and Systems (IROS), Nov. 2013, pp. 3663-3670, IEEE, Tokyo, Japan.

(Continued)

*Primary Examiner* — Rachid Bendidi
(74) *Attorney, Agent, or Firm* — McDonnell Boehnen Hulbert & Berghoff LLP

(57) ABSTRACT

A method for determining a step path involves obtaining a reference step path for a robot with at least three feet. The reference step path includes a set of spatial points on a surface that define respective target touchdown locations for the at least three feet. The method also involves receiving a state of the robot. The method further involves generating a reference capture point trajectory based on the reference step path. Additionally, the method involves obtaining at least two potential step paths and a corresponding capture point trajectory. Further, the method involves selecting a particular step path of the at least two potential step paths based on a relationship between the at least two potential step paths, the potential capture point trajectory, the reference step path, and the reference capture point trajectory. The method additionally involves instructing the robot to begin stepping in accordance with the particular step path.

17 Claims, 10 Drawing Sheets

(56) References Cited

U.S. PATENT DOCUMENTS

| | | |
|---|---|---|
| 5,644,204 A | 7/1997 | Nagle |
| 5,737,217 A | 4/1998 | Nishikawa et al. |
| 5,808,433 A | 9/1998 | Tagami et al. |
| 5,838,130 A | 11/1998 | Ozawa |
| 5,974,366 A | 10/1999 | Kawai et al. |
| 6,064,167 A | 5/2000 | Takenaka et al. |
| 6,374,157 B1 | 4/2002 | Takamura |
| 6,484,068 B1 | 11/2002 | Yamamoto et al. |
| 6,493,607 B1 | 12/2002 | Bourne et al. |
| 6,802,382 B2 | 10/2004 | Hattori et al. |
| 6,943,520 B2 | 9/2005 | Furuta et al. |
| 6,992,455 B2 | 1/2006 | Kato et al. |
| 6,992,457 B2 | 1/2006 | Furuta et al. |
| 6,999,851 B2 | 2/2006 | Kato et al. |
| 7,013,201 B2 | 3/2006 | Hattori et al. |
| 7,076,331 B1 | 7/2006 | Nagatsuka et al. |
| 7,120,518 B2 | 10/2006 | Takenaka et al. |
| 7,236,852 B2 | 6/2007 | Moridaira et al. |
| 7,386,364 B2 | 6/2008 | Mikami et al. |
| 7,603,234 B2 | 10/2009 | Takenaka et al. |
| 7,606,634 B2 | 10/2009 | Takenaka et al. |
| 7,657,345 B2 | 2/2010 | Endo et al. |
| 7,734,377 B2 | 6/2010 | Hasegawa |
| 7,734,378 B2 | 6/2010 | Takenaka et al. |
| 7,881,824 B2 | 2/2011 | Nagasaka et al. |
| 7,949,430 B2 | 5/2011 | Pratt et al. |
| 7,957,835 B2 * | 6/2011 | Suga .................. B62D 57/032 318/568.12 |
| 8,060,253 B2 | 11/2011 | Goswami et al. |
| 8,108,070 B2 | 1/2012 | Tajima |
| 8,150,550 B2 | 4/2012 | Suga et al. |
| 8,172,013 B2 | 5/2012 | Shimada |
| 8,195,332 B2 | 6/2012 | Pratt et al. |
| 8,239,084 B2 | 8/2012 | Yamamoto et al. |
| 8,306,657 B2 | 11/2012 | Yoshiike et al. |
| 8,311,731 B2 | 11/2012 | Sugiura |
| 8,332,068 B2 | 12/2012 | Goswami et al. |
| 8,386,076 B2 | 2/2013 | Honda et al. |
| 8,396,593 B2 | 3/2013 | Orita |
| 8,457,830 B2 | 6/2013 | Goulding |
| 8,532,824 B2 | 9/2013 | Orita |
| 8,565,921 B2 | 10/2013 | Doi |
| 8,583,283 B2 | 11/2013 | Takenaka et al. |
| 8,630,763 B2 | 1/2014 | Goulding |
| 8,688,307 B2 | 4/2014 | Sekiya |
| 8,738,178 B2 | 5/2014 | Choi et al. |
| 8,825,391 B1 | 9/2014 | Urmson et al. |
| 8,849,454 B2 | 9/2014 | Yun et al. |
| 8,855,820 B2 | 10/2014 | Watabe |
| 8,855,821 B2 | 10/2014 | Seo et al. |
| 8,924,021 B2 | 12/2014 | Dariush et al. |
| 8,948,956 B2 | 2/2015 | Takahashi et al. |
| 8,965,573 B2 | 2/2015 | Maisonnier et al. |
| 9,044,859 B2 | 6/2015 | Cory |
| 9,044,862 B2 | 6/2015 | Kim et al. |
| 9,102,055 B1 | 8/2015 | Konolige et al. |
| 9,207,678 B2 | 12/2015 | Kim |
| 9,266,233 B2 | 2/2016 | Kornbluh et al. |
| 9,317,743 B2 | 4/2016 | Datta et al. |
| 9,352,470 B1 | 5/2016 | da Silva et al. |
| 2002/0183897 A1 | 12/2002 | Kuroki et al. |
| 2003/0009259 A1 | 1/2003 | Hattori et al. |
| 2003/0154201 A1 | 8/2003 | Berestov |
| 2004/0044440 A1 | 3/2004 | Takenaka |
| 2004/0099450 A1 | 5/2004 | Kwok et al. |
| 2004/0167641 A1 | 8/2004 | Kawai et al. |
| 2004/0172165 A1 | 9/2004 | Iribe et al. |
| 2004/0193323 A1 | 9/2004 | Higaki et al. |
| 2004/0205417 A1 | 10/2004 | Moridaira et al. |
| 2004/0230340 A1 | 11/2004 | Fukuchi et al. |
| 2004/0236467 A1 | 11/2004 | Sano |
| 2005/0021176 A1 | 1/2005 | Takenaka et al. |
| 2005/0067993 A1 | 3/2005 | Kato et al. |
| 2005/0075755 A1 | 4/2005 | Takenaka et al. |
| 2005/0077856 A1 | 4/2005 | Takenaka et al. |
| 2005/0110448 A1 | 5/2005 | Takenaka et al. |
| 2005/0113973 A1 | 5/2005 | Endo et al. |
| 2005/0120820 A1 | 6/2005 | Takenaka et al. |
| 2005/0156551 A1 * | 7/2005 | Takenaka ............. B25J 13/088 318/568.12 |
| 2005/0216097 A1 | 9/2005 | Rifkin |
| 2005/0228539 A1 | 10/2005 | Takenaka et al. |
| 2005/0240307 A1 | 10/2005 | Kuroki et al. |
| 2006/0064203 A1 | 3/2006 | Goto et al. |
| 2006/0076167 A1 | 4/2006 | Setrakian et al. |
| 2006/0173578 A1 * | 8/2006 | Takenaka ............. B62D 57/032 700/245 |
| 2006/0247800 A1 | 11/2006 | Takenaka et al. |
| 2007/0003915 A1 | 1/2007 | Templeman |
| 2007/0126387 A1 | 6/2007 | Takenaka et al. |
| 2007/0150095 A1 | 6/2007 | Zaier |
| 2007/0152620 A1 | 7/2007 | Takenaka et al. |
| 2007/0156283 A1 | 7/2007 | Takenaka |
| 2007/0193789 A1 | 8/2007 | Takenaka et al. |
| 2007/0220637 A1 | 9/2007 | Endo et al. |
| 2007/0227786 A1 | 10/2007 | Hillis et al. |
| 2007/0241713 A1 * | 10/2007 | Yamamoto ........... B62D 57/032 318/568.12 |
| 2008/0065269 A1 | 3/2008 | Hasegawa |
| 2008/0133055 A1 | 6/2008 | Hasegawa |
| 2008/0160873 A1 | 7/2008 | Yoneda |
| 2008/0208391 A1 | 8/2008 | Hasegawa et al. |
| 2009/0005906 A1 * | 1/2009 | Tajima ................. B62D 57/032 700/245 |
| 2009/0030530 A1 | 1/2009 | Martin |
| 2009/0171503 A1 | 7/2009 | Takenaka et al. |
| 2009/0306821 A1 * | 12/2009 | Park .................... B62D 57/032 700/245 |
| 2009/0312867 A1 | 12/2009 | Hasegawa et al. |
| 2009/0325699 A1 | 12/2009 | Delgiannidis |
| 2010/0017028 A1 * | 1/2010 | Suga ................... B62D 57/032 700/245 |
| 2010/0057253 A1 | 3/2010 | Kwon et al. |
| 2010/0113980 A1 | 5/2010 | Herr et al. |
| 2010/0126785 A1 | 5/2010 | Shimada |
| 2010/0161120 A1 * | 6/2010 | Goswami ............. B62D 57/032 700/245 |
| 2010/0161126 A1 | 6/2010 | Goswami et al. |
| 2010/0174409 A1 | 7/2010 | Park et al. |
| 2010/0252395 A1 | 10/2010 | Lehtonen et al. |
| 2010/0277483 A1 | 11/2010 | Lee et al. |
| 2010/0292838 A1 | 11/2010 | Goswami et al. |
| 2011/0009241 A1 | 1/2011 | Lane et al. |
| 2011/0022232 A1 | 1/2011 | Yoshiike et al. |
| 2011/0098857 A1 * | 4/2011 | Yoshiike ............. B62D 57/032 700/246 |
| 2011/0098860 A1 * | 4/2011 | Yoshiike ............. B62D 57/032 700/260 |
| 2011/0172825 A1 | 7/2011 | Lee et al. |
| 2011/0178637 A1 | 7/2011 | Lee et al. |
| 2011/0224827 A1 | 9/2011 | Andoh |
| 2011/0231050 A1 * | 9/2011 | Goulding ............. B62D 57/024 701/26 |
| 2011/0257764 A1 | 10/2011 | Herr et al. |
| 2011/0264264 A1 * | 10/2011 | Shirokura ............ B62D 57/032 700/245 |
| 2011/0301756 A1 * | 12/2011 | Yoshiike ............. B62D 57/032 700/253 |
| 2012/0072026 A1 * | 3/2012 | Takagi ................... B25J 9/1075 700/261 |
| 2012/0158175 A1 | 6/2012 | Lee et al. |
| 2012/0203359 A1 | 8/2012 | Schimmels et al. |
| 2012/0245734 A1 * | 9/2012 | Yun ..................... B62D 57/032 700/253 |
| 2012/0259463 A1 | 10/2012 | Orita |
| 2012/0277907 A1 | 11/2012 | Kim |
| 2012/0310412 A1 * | 12/2012 | Seo ....................... B25J 9/0006 700/254 |
| 2012/0316662 A1 | 12/2012 | Huh |
| 2012/0316683 A1 * | 12/2012 | Seo ..................... B62D 57/032 700/261 |
| 2012/0316684 A1 | 12/2012 | Lee et al. |

(56) References Cited

U.S. PATENT DOCUMENTS

| | | | |
|---|---|---|---|
| 2013/0079929 A1* | 3/2013 | Lim | B62D 57/032 700/250 |
| 2013/0144439 A1 | 6/2013 | Lee et al. | |
| 2013/0178983 A1* | 7/2013 | Watabe | G05D 3/12 700/258 |
| 2013/0184861 A1* | 7/2013 | Pratt | G05D 1/021 700/245 |
| 2013/0206488 A1 | 8/2013 | Horinouchi | |
| 2013/0238122 A1 | 9/2013 | Hodgins et al. | |
| 2013/0238183 A1 | 9/2013 | Goulding | |
| 2014/0019082 A1 | 1/2014 | Lan et al. | |
| 2015/0051734 A1 | 2/2015 | Zheng et al. | |
| 2015/0073592 A1* | 3/2015 | Kaneko | B62D 57/032 700/245 |
| 2015/0120044 A1 | 4/2015 | Cory | |
| 2015/0134080 A1 | 5/2015 | Roh | |
| 2015/0202768 A1* | 7/2015 | Moridaira | B62D 57/032 700/258 |

OTHER PUBLICATIONS

Doshi et al., "Collision Detection in Legged Locomotion using Supervised Learning", 2007, 6 pages, MIT Cambridge, US.

Non-Final Office Action mailed on Apr. 29, 2016, issued in connection with U.S. Appl. No. 14/709,830, filed May 12, 2015, 39 pages.

Pratt et al, "Capture Point: A Step Toward Humanoid Push Recovery" Symposium, Dec. 2-6, 2006, pp. 1-8, Genoa, Italy.

Koolen et al, "Caturability-based Analysis and Control of Legged Locomotion, Part 1: Theory and Application to Three Simple Gait Models," Nov. 2011, pp. 1-28.

Pratt et al, "Capturability-Based Analysis and Control of Legged Locomotion, Part 2: Application to M2V2, a Lower Body Humanoid," Apr. 2011, pp. 1-25.

Ott et al., "Humanoid Walking Control using the Capture Point," Institute of Robotics and Mechatronics German Aerospace Center, Oct. 26, 2011, 30 pages, http://typo.iwr.uni-heidelberg.de/groups/orb/conferences-workshops/humanoids2011/.

Abe et al., "Multiobjective Control with Frictional Contacts," Eurographics/ACM SIGGRAPH Symposium on Computer Animation, Aug. 4-5, 2007, San Diego, California, 10 pages.

Hashlamon et al., "Simple Virtual Slip Force Sensor for Walking Biped Robots," IEEE, 2013, pp. 1-5.

Kim et al., "Landing Force Controller for a Humanoid Robot: Time-Domain Passivity Approach," 2006 IEEE Conference on Systems, Man, and Cybernetics, Oct. 8-11, 2006, Taipei, Taiwan, pp. 4237-4242.

Silva et al., "Goal-Oriented Biped Walking Based on Force Interaction Control," Proceedings of the 2001 IEEE International Conference on Robotics & Automation, Seoul, Korea, May 21-26, 2001, pp. 4122-3127.

Silva et al., "Towards Force Interaction Control of Biped Walking Robots," Proceedings of 2004 IEEE/RSJ International Conference on Intelligent Robots and Systems, Sendai, Japan, Sep. 28-Oct. 2, 2004, pp. 2568-2573.

Non-Final Office Action mailed on Aug. 19, 2015, issued in connection with U.S. Appl. No. 14/468,118, filed Aug. 25, 2014, 14 pages.

Notice of Allowance mailed on Mar. 14, 2016, issued in connection with U.S. Appl. No. 14/468,118, filed Aug. 25, 2014, 10 pages.

Non-Final Office Action mailed on Sep. 2, 2015, issued in connection with U.S. Appl. No. 14/468,031, filed Aug. 25, 2014, 31 pages.

Non-Final Office Action mailed on Jun. 3, 2016, issued in connection with U.S. Appl. No. 14/538,777, filed Nov. 11, 2014, 16 pages.

Notice of Allowance mailed on Mar. 2, 2016, issued in connection with U.S. Appl. No. 14/468,031, filed Aug. 25, 2014, 7 pages.

Notice of Allowance mailed on Jun. 24, 2016, issued in connection with U.S. Appl. No. 14/538,777, filed Nov. 11, 2014, 20 pages.

Notice of Allowance mailed on Jul. 21, 2016, issued in connection with U.S. Appl. No. 14/585,542, filed Dec. 30, 2014, 5 pages.

Non-Final Office Action mailed on Apr. 15, 2016, issued in connection with U.S. Appl. No. 14/585,542, filed Dec. 30, 2014, 12 pages.

Stephens, Benjamin, U.S. Appl. No. 14/585,542, filed Dec. 30, 2014, entitled "Mechanically-Timed Footsteps for a Robotic Device," 51 pages.

Stephens, Benjamin, U.S. Appl. No. 15/331,167, filed Oct. 21, 2016, entitled "Mechanically-Timed Footsteps for a Robotic Device," 51 pages.

Barasuol, Victor et al., "A Reactive Controller Framework for Quadrupedal Locomotion on Challenging Terrain", IEEE International Conference on Robotics and Automation (ICRA), Karlsruhe, Germany, May 6-10, 2013, pp. 2539-2546.

Byl, Katie et al., "Bang-Bang Trajectory Plans With Dynamic Balance Constraints: Fast Rotational Reconfigurations for Robosimian", ASME Dynamic Systems and Control Conference, Oct. 22-24, 2014, San Antonio, TX, pp. 1-10.

"BigDog Overview", Boston Dynamics, 2008, pp. 1-22.

* cited by examiner

DETERMINATION OF ROBOTIC STEP PATH

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic devices become increasingly prevalent in numerous aspects of modern life, it is desirable for robotic devices to be efficient. Therefore, a demand for efficient robotic devices has helped open up a field of innovation in actuators, movement, sensing techniques, as well as component design and assembly.

SUMMARY

The present application discloses implementations that relate to determining a step path. One example involves obtaining a reference step path for a robot with at least three feet. The reference step path includes a set of spatial points on a surface that define respective target touchdown locations for the at least three feet. The example also involves receiving a state of the robot. The state includes a position of the robot, a velocity of the robot, and respective positions of the at least three feet of the robot. The example further involves generating a reference capture point trajectory based on the reference step path and the state of the robot. The reference capture point trajectory defines a predicted path that a center of pressure of the robot would travel along provided that the robot stepped in accordance with the reference step path. Additionally, the example involves obtaining at least two potential step paths for the robot and a corresponding potential capture point trajectory. Further, the example involves selecting a particular step path of the at least two potential step paths based on a relationship between the at least two potential step paths, the potential capture point trajectory, the reference step path, and the reference capture point trajectory. The example additionally involves instructing the robot to begin stepping in accordance with the particular step path.

Another example describes a non-transitory computer-readable medium having instructions stored thereon that, upon execution by at least one processor, causes a robot to perform a set of operations. The operations include obtaining a reference step path for a robot with at least three feet. The reference step path includes a set of spatial points on a surface that define respective target touchdown locations for at least a first foot, a second foot, and a third foot of the robot. The operations also include receiving a state of the robot. The state includes a position of the robot, a velocity of the robot, and respective positions of the at least three feet of the robot. The operations further include generating a reference capture point trajectory based on the reference step path and the state of the robot. The reference capture point trajectory defines a predicted path that a center of pressure of the robot would travel along provided that the robot stepped in accordance with the reference step path. Additionally, the operations include obtaining at least two potential step paths for the robot and a corresponding potential capture point trajectory. Further, the operations include selecting a particular step path of the at least two potential step paths based on a relationship between the at least two potential step paths, the potential capture point trajectory, the reference step path, and the reference capture point trajectory. The example additionally involves instructing the robot to begin stepping in accordance with the particular step path.

In still another example, the present application describes a robot. The robot includes at least three feet and a control system. The control system is configured to perform a set of operations. The operations include obtaining a reference step path for the robot. The reference step path includes a set of spatial points on a surface that define respective target touchdown locations for the at least three feet. The operations also include receiving a state of the robot. The state includes a position of the robot, a velocity of the robot, and respective positions of the at least three feet of the robot. The operations further include generating a reference capture point trajectory based on the reference step path and the state of the robot. The reference capture point trajectory defines a predicted path that a center of pressure of the robot would travel along provided that the robot stepped in accordance with the reference step path. Additionally, the operations include obtaining at least two potential step paths for the robot and a corresponding potential capture point trajectory. Further, the operations include selecting a particular step path of the at least two potential step paths based on a relationship between the at least two potential step paths, the potential capture point trajectory, the reference step path, and the reference capture point trajectory. The example additionally involves instructing the robot to begin stepping in accordance with the particular step path.

The system includes a means for obtaining a reference step path for a robot with at least three feet. The reference step path includes a set of spatial points on a surface that define respective target touchdown locations for the at least three feet. The system also includes a means for receiving a state of the robot. The state includes a position of the robot, a velocity of the robot, and respective positions of the at least three feet of the robot. The system further includes a means for generating a reference capture point trajectory based on the reference step path and the state of the robot. The reference capture point trajectory defines a predicted path that a center of pressure of the robot would travel along provided that the robot stepped in accordance with the reference step path. Additionally, the system includes a means for obtaining at least two potential step paths for the robot and a corresponding potential capture point trajectory. Further, the system includes a means for selecting a particular step path of the at least two potential step paths based on a relationship between the at least two potential step paths, the potential capture point trajectory, the reference step path, and the reference capture point trajectory. The system additionally includes a means for instructing the robot to begin stepping in accordance with the particular step path.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
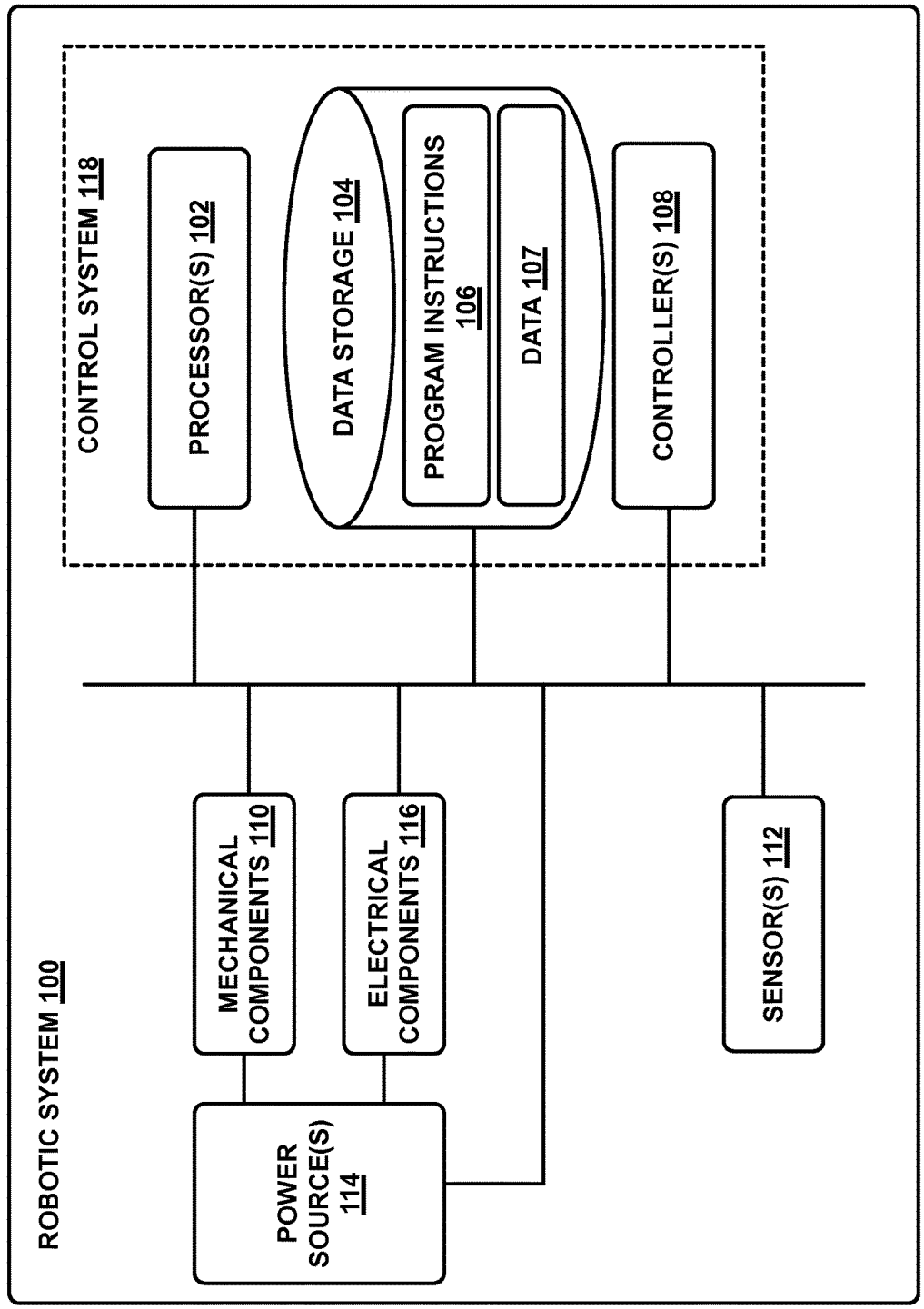
FIG. 1 illustrates a configuration of a robotic system, according to an example implementation.

The following detailed description describes various features and operations of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

I. OVERVIEW

The present application discloses implementations that relate to step path determination for legged robots. Control of legged robots may involve carrying out a step path that follows a particular trajectory and maintains stability. However, in some situations, a legged robot might not be capable of carrying out the particular trajectory and/or maintaining a particular level of stability. For instance, some trajectories may require the robot's legs to step beyond their operational range-of-motion. As another example, another trajectory may result in the robot's body falling over. Regardless of the scenario, a particular trajectory, step path, and/or level of stability may not be feasible given the state of the robot.

An example implementation involves obtaining potential step paths and evaluating them against a reference step path. Based on a relationship between a particular potential step path and the reference step path, a control system or computing device may calculate an error value that indicates an extent of similarity between the potential step path and the reference step path. This error value may also be referred to herein as the "foot placement error." The error values produced by these evaluations may serve as a basis for selecting a potential step path to be carried out by a legged robot. As one example, the potential step path associated with the lowest error value may be selected (e.g., because the lowest error value is indicative of a potential step path from among multiple potential step paths that is most similar to the reference step path). In other situations, a potential step path associated with an error value that is below a threshold error value may be selected (e.g., because the threshold error value represents an acceptable or satisfactory level of error).

In some implementations, the evaluation may also account for differences in the levels of stability between the reference step path and a potential step path. The stability of a given step path may be calculated or determined based on some stability criterion. In some examples, the stability criterion may be based on the legged robot's "capture point" at various points in time along a given step path. The error value indicating the difference in stability between the reference step path and a potential step path may be referred to herein as the "capture point trajectory error." The capture point is described below in greater detail. Performing the evaluation may produce a combined error value that represents both the extent of deviation between the reference step path and the potential step path, and the difference in stability between the reference step path and the potential step path. A potential step path may be selected on the basis of this combined error value.

In determining the combined error value, the foot placement error and the capture point trajectory error may each be weighted by a respective weighting value. By setting a high weight to the foot placement error and a lower weight to the capture point trajectory error, the step path determination technique may prioritize selecting a potential step path that is similar to the reference step path, at the cost of the step path potentially being unstable (or less stable). Conversely, by setting a high weight to the capture point trajectory error and a low weight to the foot placement error, the step path determination technique may prioritize selecting a potential step path that is highly stable, at the cost of the step path potentially deviating from the reference step path.

Upon selecting a potential step path, the robot may be instructed to begin stepping in accordance with the selected step path. Instructing the robot may involve causing the actuators in a leg of the robot to begin moving the associated foot towards the first stepping location in the selected step path. As environmental conditions change or external forces act on the robot, it may be desired to update the step path to account for such circumstantial changes. Thus, the process of selecting a potential step path may be performed multiple times in a given stance period.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
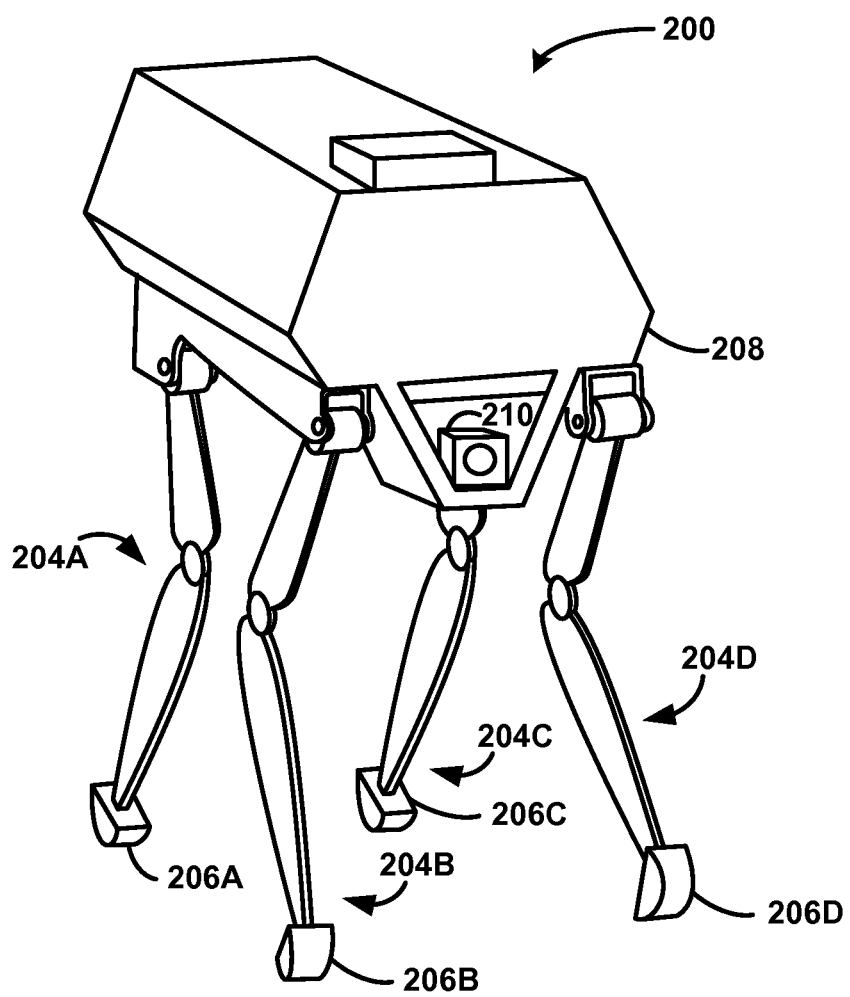
FIG. 2 illustrates a perspective view of a quadruped robot, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
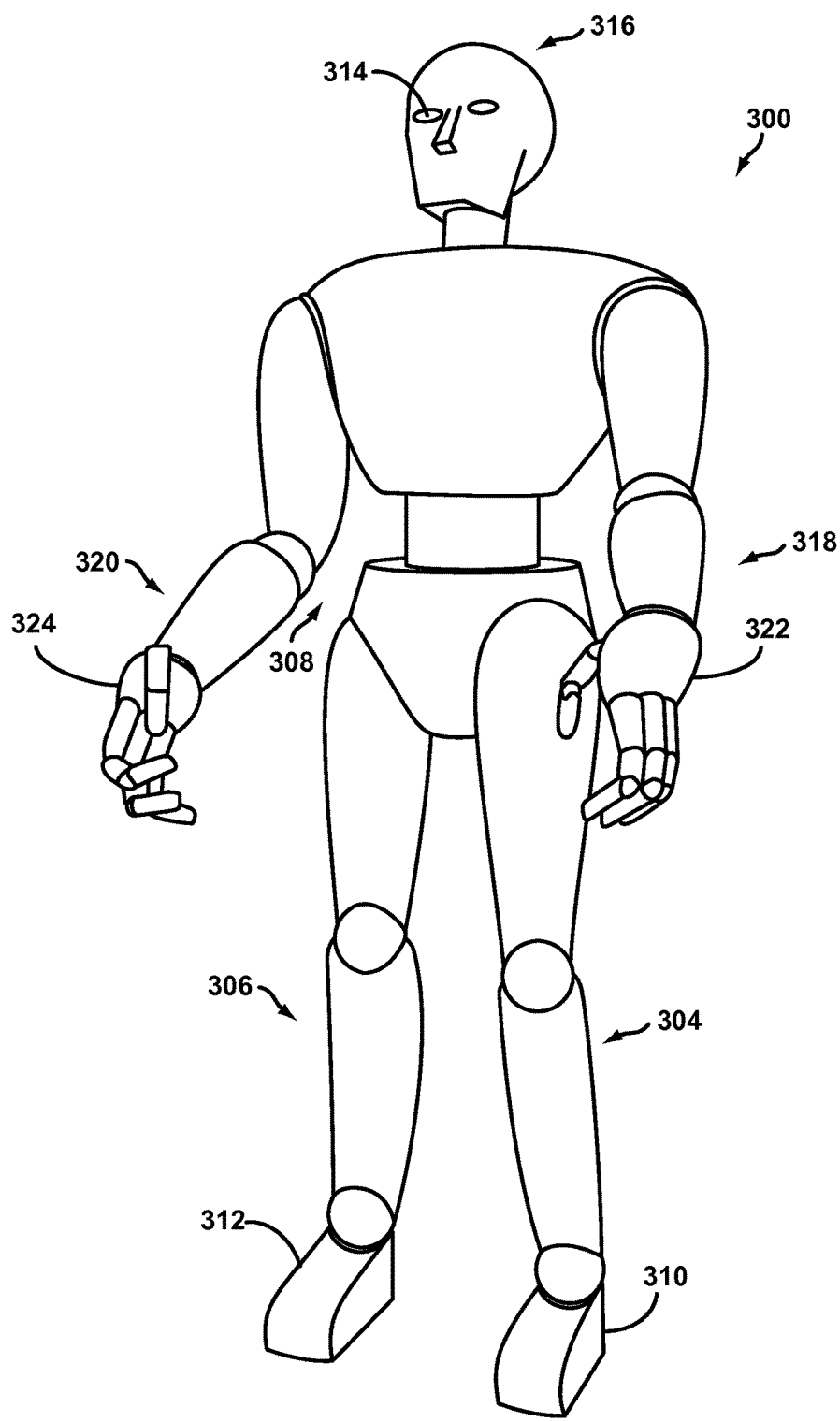
FIG. 3 illustrates a perspective view of a biped robot, according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. BALANCE CONTROL

Generally, balancing a legged robot involves apply forces with the robot's legs in order to maintain an upright position of the body. Some legged robots are composed of multiple components and appendages, each of which may be associated with a particular position, velocity, and/or orientation at a given point in time. Determining how to control the various degrees of freedom of such a complex robot in order to maintain balance may be difficult. However, if the legged robot were represented in a simplified form, balancing the legged robot may involve balancing this simpler representation of the robot.

One way to achieve balance control involves reducing the robot's state to such a simplified form, determining how the state of the simplified form should be changed to maintain balance, and determining how the robot's various components should operate in order to achieve that change in state. This process may utilize a model of the robot in order to "convert" between the robot's complex state into its simplified representation.

An example simplified representation of a legged robot is a linear inverted pendulum (LIP). The LIP model may represent the legged robot as a point mass located at the robot's center of mass (CoM) affixed to a massless rigid arm, which pivots at a point on the ground referred to as the center of pressure (CoP). In the context of the LIP model, regulating the legged robot's balance involves maintaining the upright position of the point mass. On a flat surface where the robot is stationary, this stable location for the point mass (and therefore the robot's CoM) is directly above the robot's CoP. Thus, balance control of a legged robot may be achieved by either controlling the robot's CoM and/or the robot's CoP.

One LIP-based control technique for legged robots involves determining a location on the ground that, if the CoP was instantaneously moved to that location, the CoM would be balanced in the upright position. This CoP location may be referred to herein as the "capture point." Once the capture point is determined, it may be used as a dynamic stability criterion for the legged robot's balance and control. For example, moving the robot's legs such that the robot's overall CoP is placed at the capture point would cause the robot's motion to halt. As another example, moving the robot's legs such that the robot's overall CoP is placed near the capture point may cause the robot to maintain some velocity, increase acceleration, or decrease acceleration. Regardless of its use, the capture point may serve as a basis for achieving balance or controlled locomotion of a legged robot.

Figure 4:
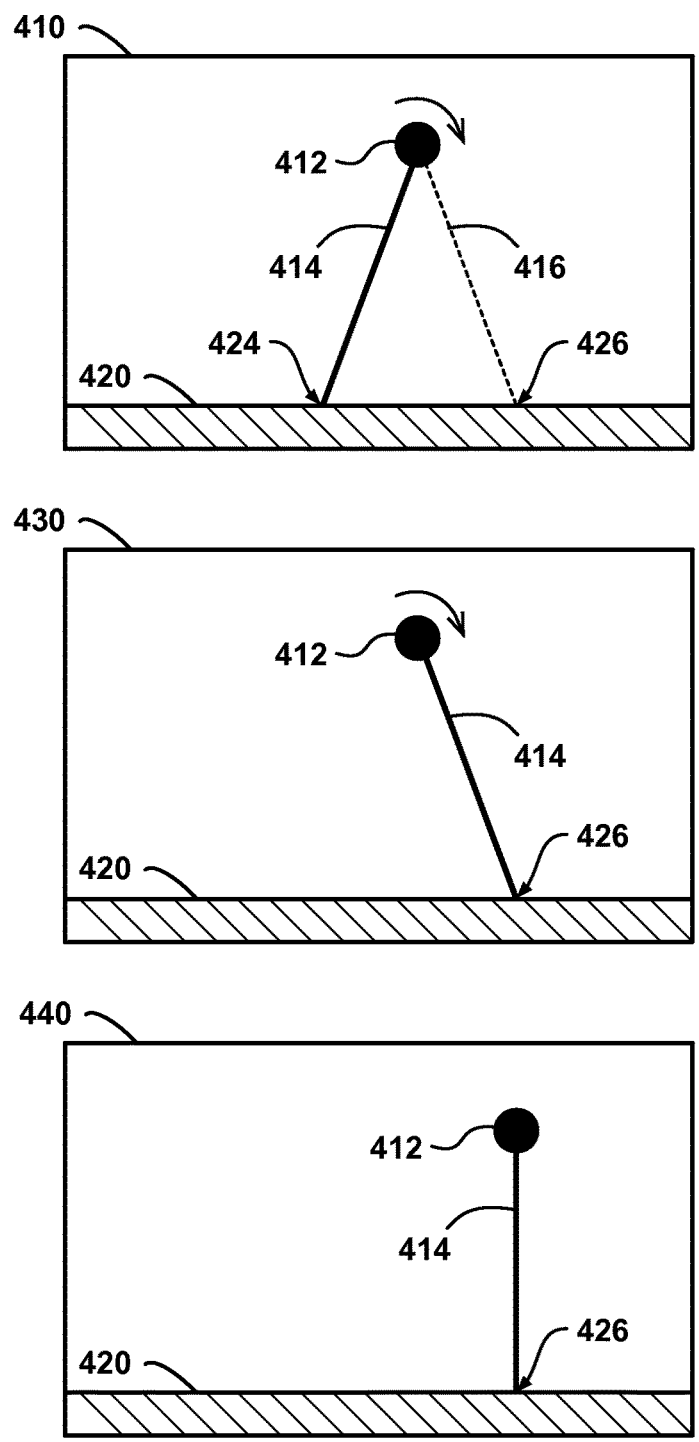
FIG. 4 is a conceptual illustration of a linear inverted pendulum, according to an example implementation.

FIG. 4 illustrates an example technique for balancing a LIP. The LIP includes a point mass 412 connected to a rigid massless arm 414, which is pivoted on the ground 420 at position 424. At a first time 410, the point mass 412 is moving to the right (e.g., the LIP is "tipping" over, as indicated by the arrow). In this example, capture point for the LIP at first time 410 is located at position 426. Thus, one way to stabilize the LIP—that is, bring the point mass 412 to rest at the upright position—is to move the rigid massless arm 414 to stabilizing position 416 and pivot at the capture point position 426. Thus, at second time 430, the rigid massless arm 414 is moved to the stabilizing position pivoted at capture point position 426. This causes the point mass 412 to begin to slow down and eventually come to rest at third time 440 in the upright position.

Figure 5:
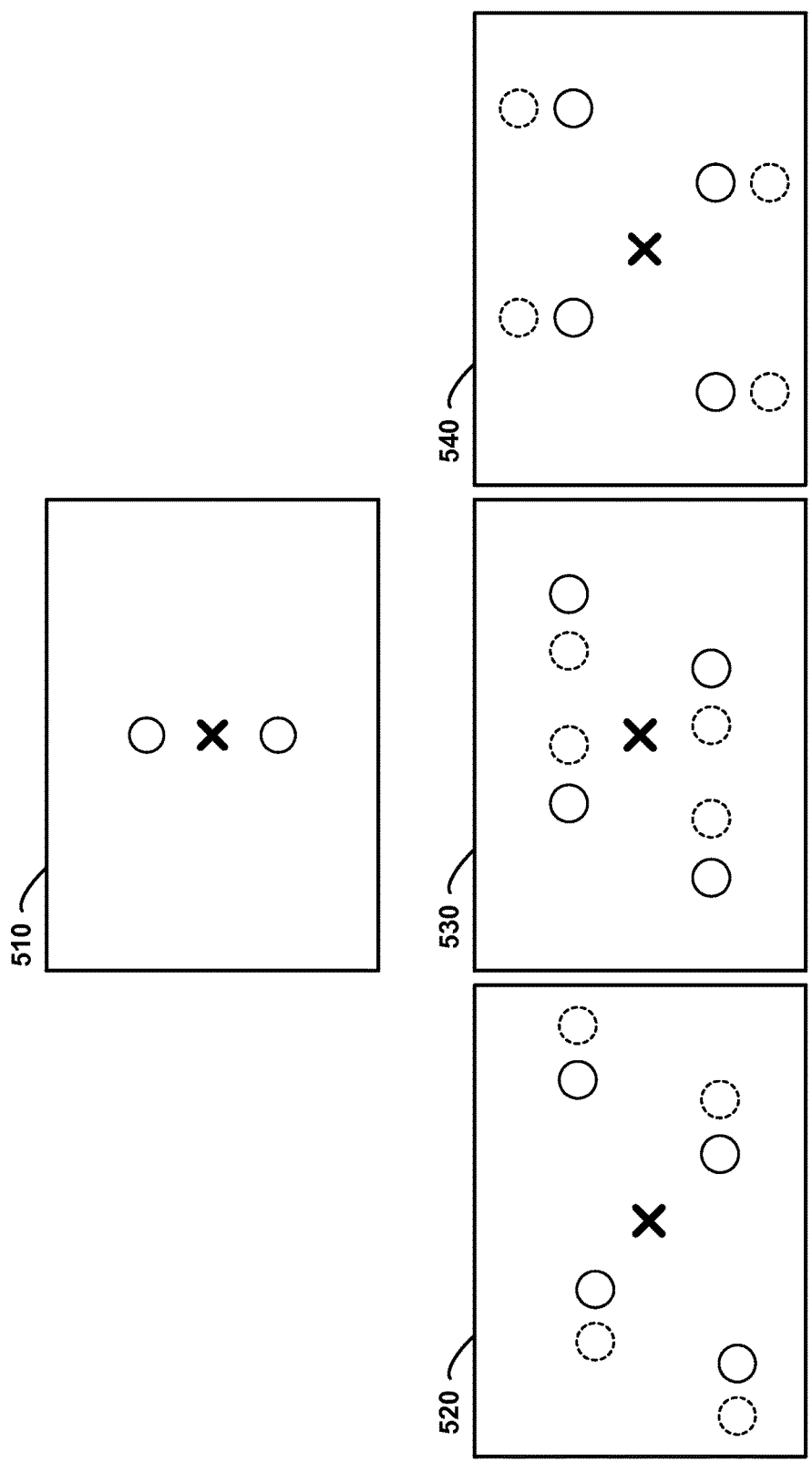
FIG. 5 illustrates a top-down view of footstep configurations, according to an example implementation.

In the context of bipedal robots, the capture point may be applied directly to one of the two feet of the bipedal robot. A typical bipedal gait involves planting one foot on the ground and leaning on that foot while the other foot swings forward. In these contexts, the capture point may represent a location on the ground that, if the swing leg were instantaneously placed at that location, the bipedal robot's motion would stop. Thus, the capture point (or some location proximate to the capture point) may directly correlate to the bipedal robot's foot position. Frame 510 in FIG. 5 depicts a conceptual illustration of a biped robot's stance at rest. In frame 510, the biped robot's two feet (represented as circles) are both planted on the ground, and the virtual CoP position (represented by the "x") is positioned directly between the two feet.

However, in the context of robots with three or more legs, the capture point may not directly correlate to a single foot position of the robot. For those types of robots, the CoP position—that is, the virtual "pivot point" of the massless rigid arm connected to the robot's CoM—may be defined collectively by the respective positions of the robot's three or more legs. Thus, in control systems of robots with three or more legs employing the capture point as a basis for control, the capture point itself may be used to determine multiple foot positions corresponding to some or all of the robot's three or more legs. Because multiple foot configurations may share a common capture point, a single capture point may define multiple foot configurations.

Thus, for robots with three or more legs, multiple sets of foot positions may correspond to a single CoP position. For example, rotating a set of foot positions in place (e.g., changing the robot's orientation but not its translational position) may not necessarily alter the CoP position of the robot. As another example, a wide set of foot positions (e.g., foot positions that are "spread out") and a narrow set of foot positions (e.g., foot positions that are close together) that are both centered over a particular location may share a common CoP position. Thus, a LIP-based control system utilizing capture point for a robot with three or more legs may not only determine the capture point for the robot, but also select a particular arrangement of foot positions that places the CoP at or near the capture point. Frames 520, 530, and 540 shown in FIG. 5 illustrate example foot configurations for a quadruped robot that all share a common CoP position. In FIG. 5, dotted-lined circles represent one set of foot positions, while solid-lined circles represent another set of foot positions (where both sets of foot positions share a common CoP). Note that the CoP positions illustrated in FIG. 5 may be similar to center of footprint (CoF) positions (e.g., an average position of the robot's feet).

A robust control system may operate under two main modalities: behavior regulation, and goal planning. Behavior regulation may involve operating certain components of a robot to accomplish a goal. When a goal is simple, behavior regulation may be sufficient to accomplishing that goal. For example, regulating a robot's behavior to maintain stationary balance may involve controlling the robot's CoP to be at or near the capture point.

However, real world situations often present obstacles, limitations, or other requirements that make achieving goals more complex and dynamic. An example goal may be to have the robot walk along a narrow and curvy trail. Unlike the previous example, aspects of this goal may change over the course of the robot's operation. For instance, the robot may not only need to stay balanced, but also may need to turn left or right in order to follow the narrow and curvy trail. Additionally, the path may turn sharply, requiring the robot to take small and slow steps near the sharp turn to avoid leg collisions. Thus, the goal not only involves maintaining balance, but also movement, turning, and avoiding stepping outside of the trail. Furthermore, the movement may not only change during the course of operation, but instead may involve accelerating, decelerating, and/or turning.

In order to achieve robust control, a robot's behavior might be regulated, planned prior to operation, and updated during operation. Referring to the curvy trail example, the robot's behavior may be determined based on the geometry of the trial and the capabilities of the robot. For example, a control system may determine at least some of the robot's steps prior to operation and simulate those steps to ensure that those steps adequately achieve the desired goal of walking along the trail. If the simulated stepping satisfies the goal, the robot's control system may cause the robot to carry out the planned behavior. In other words, the robot's control system may perform behavior regulation on a dynamic goal, which changes as the robot moves along the trail. Additionally, the viability of the planned behavior may be assessed and updated periodically. For example, if a gust of wind produces a lateral force on the robot's body, the planned step path may be updated to account for this external force while regulating certain goals (e.g., walking closely along the path while maintaining sufficient balance).

Generally, goal planning as described herein may involve evaluating potential robot behaviors in order to assess the relative performance, viability, and degree to which those potential robot behaviors accomplishes one or more goals. Referring again to the curvy trail example, multiple stepping patterns and timings may exist that cause the robot to walk along the trail. Planning the robot's future behavior may involve evaluating each of these stepping patterns and timings to determine which one best maintains balance and stays within the boundaries of the trail. Broadly speaking, determining a robot's future stepping and movement may involve simulating multiple possible behaviors and selecting one that satisfactorily accomplishes a goal.

Accordingly, an aspect of robotic movement control in legged robots is step path planning. For the purposes of this application, a "step path" may include foot touchdown positions on the ground (or any other surface), footstep sequencing and timing (e.g., when to place each foot at its corresponding touchdown position and how long it stays planted at that position), footstep forces (e.g., the amount of force for the legs to apply while in contact with the ground), or any combination thereof. As discussed above, the capture point of a robot may serve as a basis for balance control. In some cases, a control system may be configured to step to locations that cause the robot's CoP to be positioned at or near the capture point. In these cases, because robot's CoM "follows" the robot's CoP, the robot's CoM effectively "follows" the capture point trajectory. Thus, one way to cause a legged robot to move along a desired path is to configure its control system to follow a capture point trajectory defined by that desired path.

As described above, bipedal robot foot positions directly correlate to capture points. Thus, footstep planning in bipedal robot's may involve designating a desired capture point trajectory and a desired control goal (e.g., walking at a constant velocity, accelerating, slowing to a stop, etc.), and determining the step path that accomplishes that goal. In this scenario, there may only be a single step path that both follows the capture point trajectory achieves the desired control goal.

However, unlike in bipedal robots, multiple step paths may be associated with a single capture point trajectory for robots with three or more legs. Thus, step path planning for robots with three or more legs based on a desired capture point trajectory may involve selecting one of many step paths. In some cases, step path determination may involve dynamically switching between two or more of these step paths based on the state of the robot.

The present application describes implementations that relate to footstep planning for a robot with three or more legs. A footstep planning technique may involve obtaining a desired step path and a state of the robot. By applying the reference step path and state of the robot to a model of the robot, a reference capture point trajectory corresponding to the reference step path may be determined. Then, the technique may involve evaluating two or more potential step paths and selecting one of them to be carried out by the robot.

Evaluating a potential step path may involve determining a quantitative value (e.g., a "score") that indicates the extent to which a potential step path and its corresponding potential capture point trajectory deviates from the desired step path and its corresponding desired capture point trajectory. In some implementations, the technique involves determining a step path error value between the desired and potential step paths, and a capture point trajectory error between the desired and potential capture point trajectories. These error values may be scaled, weighted, or otherwise modified or combined to determine the quantitative score.

In some instances, a desired step path may be feasibly carried out and would not violate any constraints of the robot. In these instances, a potential step path and its potential capture point trajectory may be identical to a desired step path and a desired capture point trajectory. The step path and capture point trajectory error values may indicate that the potential step path best accomplishes the desired step path (e.g., the error values may be zero, depending upon the particular implementation).

In other instances, stepping along a desired step path may not be feasible or is otherwise outside of the physical capabilities of the robot. In these instances, no potential step path that can be carried out by the robot may perfectly match the desired step path. As a result, multiple potential step paths may be obtained and evaluated as described above in order to determine which potential step path best accomplishes the desired step path and/or the desired capture point trajectory.

Weighting factors may be applied to the step path error and/or the capture point trajectory error in order to adjust the penalty imposed on deviations from the desired step path and/or the desired capture point trajectory. For example, if a large penalty is imposed on the step path error and a smaller penalty is imposed on the capture point trajectory error, the control system may prioritize selecting a potential step path that closely matches the desired step path (while giving a lower priority to stable step paths). Conversely, if a large penalty is imposed on the capture point trajectory error and a smaller penalty is imposed on the step path error, the control system may prioritize selecting a potential step path that results in a stable stepping behavior (while relaxing the preference for having the robot step along the desired step path). The weighting factors may be specified in a variety of ways to promote a variety of behaviors.

After performing this evaluation on each potential step path, the resulting scores may serve as a basis for selecting a particular potential step path to be carried out (e.g., a score that satisfies some criterion). For example, the particular potential step path associated with the lowest score may be selected (or highest score, depending on the implementation). As another example, the particular potential step path associated with a score that is above, below, or within a threshold value may be selected.

Note that, although many examples described herein focus on quadruped robots (e.g., robots with four legs), the control techniques of the present application may be applied to any robot with three or more legs.

IV. EXAMPLE CONTROL SCHEME

Figure 6:
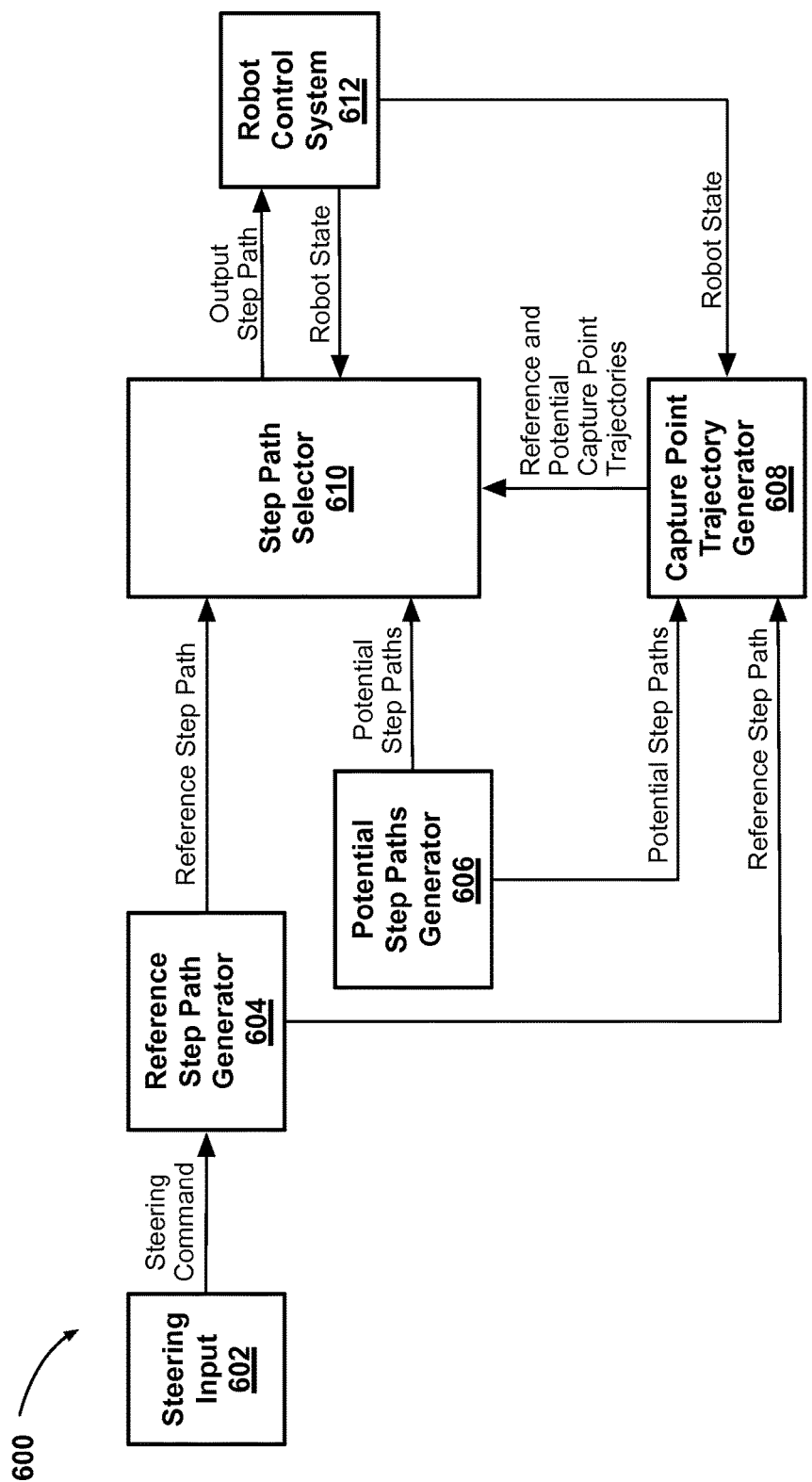
FIG. 6 is a schematic block diagram of a system, according to an example implementation.

FIG. 6 is a schematic block diagram of a system 600, according to an example implementation. The system 600 is an example system in which step path determination techniques of the present implementations may be performed. The system 600 includes steering input 602, reference step path generator 604, potential step path generator 606, capture point trajectory generator 608, step path selector 610, and robot control system 612.

The step path selector 610 may implement the step path determination techniques of the present application. As illustrated in FIG. 6, the step path selector 610 is configured to receive a reference step path, potential step paths, a reference capture point trajectory, potential capture point trajectories, and the robot state. Based on that received information, the step path selector evaluates each of the potential step paths and selects one as the output step path to be performed by the robot. The step path selector 610 may then provide that output step path to the robot control system 612 to be carried out.

Each block in system 600 may be implemented as a computing device, a computer program, program module, a circuit, or any combination thereof. Some blocks of system 600 may be incorporated within a robot, such as robot 200 or robot 300 described above. Additionally, some blocks of system 600 may be external to a robot and interfaced with the robot to instruct the robot or influence the robot's behavior. Regardless of the particular implementation, system 600 illustrated in FIG. 6 may be a combination of hardware and/or software components that are present within a robot and/or external to the robot.

The steering input 602 may be any computing device, interface, computer operation, and/or computer routine that outputs a steering command to the reference step path generator 604. In some instances, the steering input 602 may be configured to receive input from a user (e.g., via a keyboard, mouse, joystick, gamepad, or other human interface device) and determine a steering command based on that user input. In other instances, the steering input 602 may be an autonomous or semi-autonomous computing operation. For example, a robot configured to avoid obstacles may utilize the steering input 602 to influence the step path to step around a detected obstacle. In yet further instances, the steering input 602 may be configured to receive a predetermined path and provide steering commands to the reference step path generator 604 to cause the robot to step along the predetermined path. The steering command may specify a lateral velocity, a longitudinal velocity, and/or a yaw-heading rate for the robot, among other possible aspects of the robot's motion.

The reference step path generator 604 may determine the reference step path for a robot. The reference step path may be a desired, pre-planned, or otherwise predetermined step path. The reference step path may include a set of planar (e.g., two-dimensional) or spatial (e.g., three-dimensional) points on a surface that define desired foot touchdown positions on that surface. Each of the points in the step path may be associated with a particular leg of the robot, such that the set of planar or spatial points collectively define the leg sequencing and gait of the robot. In some implementations, the reference step path also specifies a step timing (e.g., an interval of time between each spatial or planar point).

The reference step path generator 604 may utilize a model of a robot for which it is generating the reference step path in order to determine the reference step path. In some cases, the model of a robot may specify certain physical limitations of the robot, such that the reference step path generator 604 generates a feasible reference step path. In other cases, the reference step path generator 604 may determine the reference step path as an idealized or otherwise preferred set of steps that accomplishes a goal, regardless of the robot's capabilities and physical limitations. Regardless of the particular implementation, the reference step path generator 604 may generate a reference step path that at least specifies the planar and/or spatial locations of desired foot touchdown locations on a surface. The reference step path generator 604 may then provide the reference step path to both the step path selector 610, as well as the capture point trajectory generator 608.

As one example scenario, a user may define the trajectory of the reference step path using a joystick. The direction that the joystick is pushed may correspond to a direction for the robot to walk along. The amount of pressure (or the degree of tilt) applied to the joystick may correspond to a velocity for the robot. Thus, a user may operate a joystick in order to produce a steering command indicative of a direction and velocity for the robot. Then, the reference step path generator 604 may employ a model of the robot in order to determine the foot step locations, spacing, and timing that would cause the robot to walk at the commanded velocity and in the commanded direction. Note that such steering commands might or might not account for obstacles or surface conditions in the environment.

Some input devices may contain multiple joysticks, buttons, triggers, directional pads, and/or other human interface devices. For example, one joystick's tilt may specify the lateral and longitudinal velocity of the robot, while another joystick's tilt specifies the yaw-heading rate. Other input device control schemas may also be implemented.

In some implementations, two-dimensional planar points are specified by a given step path. These implementations may be configured to control the lateral and longitudinal movement of a robot. Other implementations may specify single-dimensional points on a surface (e.g., either lateral or longitudinal), or may specify three dimensional spatial points on the surface to account for changes in elevation and/or uneven surfaces. For the purposes of this application, a given step path may specify any number of dimensions.

The potential step path generator 606 may be configured to generate one or more potential step paths and provide those generated step paths to the step path selector 610. The potential step path generator 606 may be similar to the reference step path generator 604, in that it may generate step paths that define possible foot touchdown locations, leg sequencing, and/or leg timing. The potential step path generator 606 may, in some instances, utilize a model of the robot for which it is generating potential step paths. Such a model may inform the potential step path generator 606 of the robot's capabilities, limitations, kinematics, typical gaits, and/or otherwise provide a "template" step path (e.g., with default foot spacing and timing) to be modified by the potential step path generator 606. The potential step path generator 606 may then provide the potential step paths (or paths) to both the step path selector 610 and the capture point trajectory generator 608.

Although not shown in FIG. 6, the potential step path generator 606 may also be configured to receive the robot state from the robot control system 612. The potential step path generator 606 may consider aspects of the robot state—such as the robot's translational and/or angular motion—when generating potential step paths. For example, if the robot has significant lateral motion (e.g., resulting from an external force that acted on the robot), the potential step paths may be generated to correct for and counteract the lateral motion by specifying footsteps that smoothly attenuate the lateral motion. Regardless of the particular potential step path generation technique, the potential step path generator 606 may generate one or more potential step paths and provide them to the step path selector 610 and the capture point trajectory generator 608.

The capture point trajectory generator 608 may be configured to generate a capture point trajectory for each of the inputted step paths. Generating a capture point trajectory for a particular step path may involve determining how the robot would behave if it stepped in accordance with the particular step path in light of the robot's current state. In some implementations, determining the robot's predicted future behavior may involve employing a model of the robot—which describes may describe the robot's dynamics, among other aspects of the robot—in order to simulate the robot's motion over the course of the particular step path. Because the capture point at a given point in time for a legged robot is defined by the robot's state at that point in time, the capture point trajectory may be calculated based on the robot's simulated motion (e.g., the predicted future state of the robot).

Capture point trajectories may be generated for the reference step path, along with each of the potential step paths inputted into the capture point trajectory generator 608. The generated capture point trajectories may then be provided to the step path selector 610 to serve as a partial basis for selecting one of the potential step paths as the output step path.

The robot control system 612 may be interfaced with sensors and actuators of the robot in order to determine aspects of the robot's state. For example, the robot control system 612 may receive information from one or more inertial measurement units (IMUs) coupled to various components of the robot in order to determine the robot's position, translational velocity, translational acceleration, orientation, angular velocity, and/or angular acceleration. As another example, the robot control system 612 may receive information from joint angle sensors and/or from actuators in order to determine the robot's "pose" (e.g., the relative angles and orientations of various components of the robot). The robot control system 612 may provide this robot state periodically, when the state changes, and/or upon request to one or more of the blocks in system 600.

The robot control system 612 may also control actuators and other components of the robot. The robot control system 612 may be configured to receive an output step path from the step path selector 610, and may cause the robot to step in accordance with the step path.

As described herein, phrases such as "step in accordance with a step path," "step along a step path," and "cause the robot to carry out the step path" refer to causing the robot's legs to step toward the locations defined by the step path. In instances where the step path includes leg sequencing and timing, these phrases may also refer to causing each of the robot's legs to step to corresponding touchdown locations at a time specified by the timing.

In some instances, the robot may or may not step in perfect accordance with the step path. For example, an external force acting on the robot after the output step path has been received at the robot control system 612 may cause the robot's stepping to deviate from the output step path. As another example, the output step path may be updated multiple times before a given foot makes contact with the ground, where updating the output step path alters the touchdown locations, leg sequencing, and/or timing of the step path to be carried out by the robot. Thus, causing the robot to "step in accordance with a step path" may generally refer to causing the robot to begin stepping toward the first touchdown location defined by the step path, even though a particular output step path may or may not be carried out to completion.

Additionally, the step path determination process may be performed continuously or semi-continuously during the operation of the robot. For example, the process may be performed tens or hundreds of times each second, such that the output step path is selected from potential step paths based on the robot's present (or recent) state.

The step path selector 610 may be configured to determine an output step path based on the reference step path, one or more potential step paths, and the robot state. The step path selector 610 may employ the step path determination techniques of the present implementations, which are described below in more detail with respect to FIG. 7 and FIG. 8.

To determine the output step path, the step path selector 610 may evaluate each potential step path according to a relationship. This relationship may provide a quantitative value or score based on the reference step path, the reference capture point trajectory, the potential step path, and the potential capture point trajectory. The score may represent an extent to which the potential step path deviates from the reference step path and/or an extent to which the potential capture point trajectory deviates from the reference capture point trajectory. The step path selector 610 may assess the resulting scores, and may select the output step path as a potential step path with a corresponding score that satisfies some criterion (e.g., the lowest score, the highest score, a score within a threshold range of scores, etc.).

Note that, although system 600 shown in FIG. 6 depicts a particular configuration of communicative connections among the various blocks, any block within system 600 may transmit and/or receive information from any of the other blocks in system 600. Additionally, any kind of information may be passed through various blocks in system 600. System 600 illustrated in FIG. 6 is provided for explanatory purposes, and techniques of the present application are not limited to the specific configuration shown in FIG. 6.

V. EXAMPLE STEP PATH DETERMINATION

Figure 7:
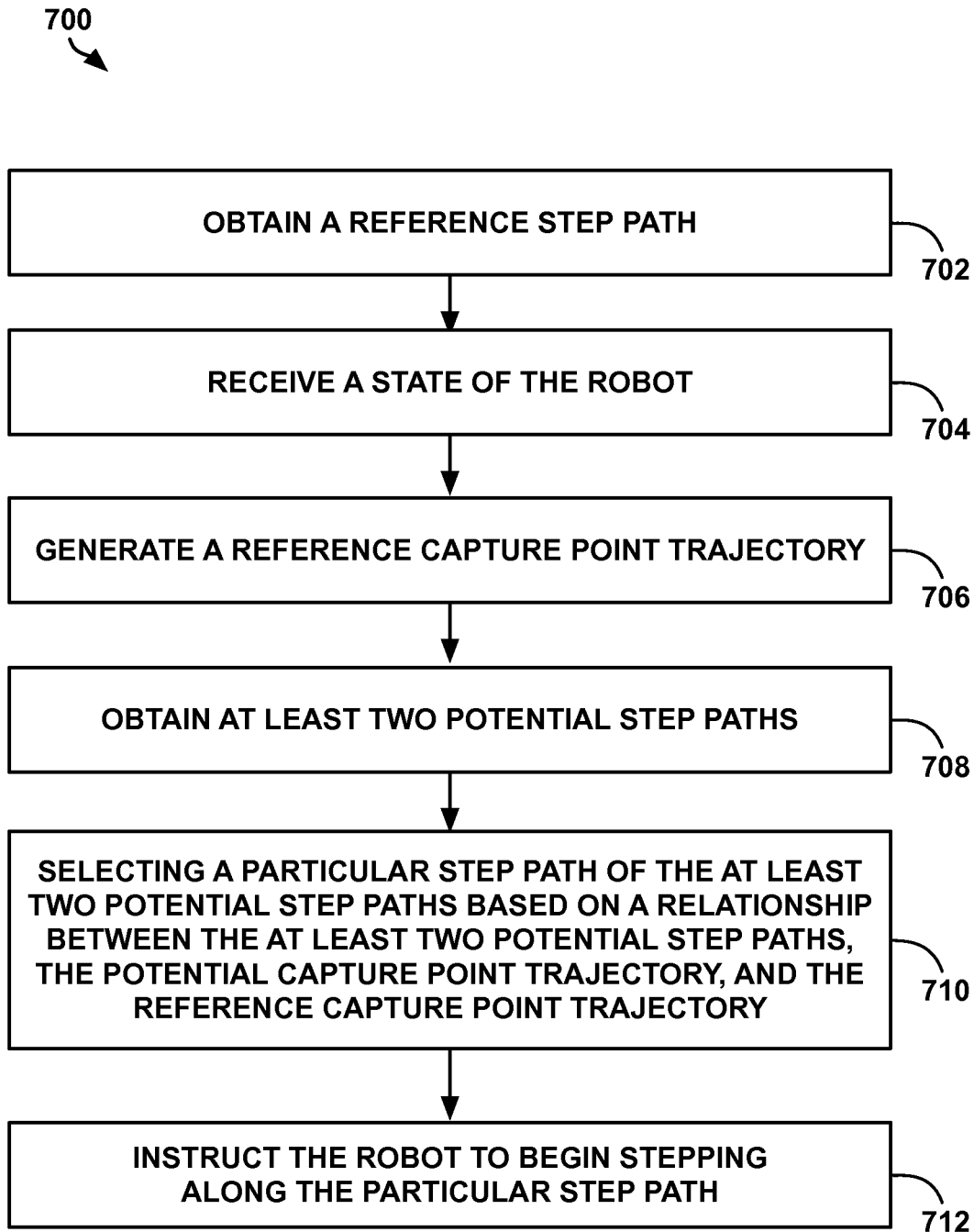
FIG. 7 is a flow chart, according to an example implementation.

FIG. 7 is a flow chart of operations 700 for determining a step path, according to an example implementation. Operations 700 shown in FIG. 7 present an implementation that could be used by the step path selector 610 of FIG. 6, for example, or more generally by other computing devices or control systems. Operations 700 may include one or more actions as illustrated by blocks 702-712. Although the blocks are illustrated in sequential order, these blocks may also be performed in parallel, and/or in a different order than those described herein. Also, the various blocks may be combined into fewer blocks, divided into additional blocks, and/or removed based upon the directed implementation.

In addition, the operations 700 and other operations disclosed herein show functionality of one possible implementation. In this regard, each block may represent a module, a segment, or a portion of program code, which includes one or more instructions executable by a processor or computing device for implementing specific logical operations or steps. The program code may be stored on any type of computer-readable medium, for example, such as a storage device included in a disk or hard drive. The computer-readable medium may include a non-transitory computer-readable medium, for example, such as computer-readable media that stores data for short periods of time like register memory, processor cache and/or random access memory (RAM). The computer-readable medium may also include non-transitory media, such as secondary or persistent long-term storage, like read-only memory (ROM), optical or magnetic disks, and compact-disc read-only memory (CD-ROM), for example. The computer-readable media may be considered a computer-readable storage medium, for example, or a tangible storage device.

In addition, one of more blocks in FIG. 7 may represent circuitry that is wired to perform the specific logical operations.

A. Obtain a Reference Step Path

Block 702 involves obtaining a reference step path. The reference step path may include a set of foot touchdown locations that—if feasible in light of the physical capabilities and current state of the robot—collectively represent a trajectory that accomplishes a desired goal. With respect to operations 700, the reference step path may serve as a benchmark against which potential step paths are evaluated. In some cases, the robot may not be capable of stepping along the reference step path (and therefore is unable to perfectly accomplish the desired goal). Thus, determining a step path for the robot to carry out may involve selecting a potential step path that is both similar to the reference step path and can be performed within the physical capabilities of the robot.

The touchdown locations may be one-dimensional, two-dimensional, or three-dimensional locations on the ground or another surface. A step path may also designate a particular foot with each touchdown location, specify a timing for each touchdown location, and/or specify a force with which to step at each touchdown location, among other stepping parameters. The step path timing may specify when a foot is to be placed at a touchdown location and how long the foot is to stay in contact with the ground at that touchdown location, among other aspects of step timing.

The reference step path may be received or obtained from a memory device or computing device that is either incorporated within a robot or external to the robot. In some instances, the reference step path represents a predetermined or pre-calculated trajectory (e.g., a test environment, pre-mapped terrain, a choreographed behavior, etc.). In other instances, the trajectory defined by the step path may be generated based on a steering command. Such a steering command may specify a desired velocity, yaw, and/or path for the robot. The steering command may be provided via a human interface, or from a computing process. For example, a robot's control system may assess the environment proximate to the robot and may provide steering commands to avoid obstacles or other environmental elements. A robot may also include a planning system that generally determines a trajectory for the robot, which may serve as the steering command from which the reference step path may be determined.

B. Receive a State of the Robot

Block 704 involves receiving a state of the robot. The state of the robot may include information indicative of the robot's position, velocity, orientation, rotational velocity, and/or the operational conditions of various components of the robot. The state of the robot may be utilized by step path determination techniques to assess the physical capabilities of the robot, the robot's balance, and the pose of the robot, among other aspects of the robot. The current state of the robot may serve as a basis for predicting the future state of the robot and/or for determining how to stabilize the robot (or accomplish some other goal).

At block 704, the state of the robot may be the present state of the robot (or more generally the state of the robot at a particular point in time). Step path determination techniques may utilize a model of the robot's configuration and dynamics to predict the future state or states of the robot if it were to carry out the reference step path. In some instances, operations 700 may additionally include an operation for determining the predicted future state or states of the robot.

One example implementation of such a future state prediction operation may involve simulating the robot's motion between its current state and the next touchdown location in the reference step path. Then, based on the predicted future state at that touchdown location, the technique may involve simulating the robot's motion between that touchdown location and the proceeding touchdown location. This process may be repeated for any number of touchdown locations in the reference step path.

A "predicted state" or "future state" as described herein may refer to one or more simulated, predicted, or otherwise determined future positions, velocities, poses, and/or operational conditions of the robot. In some implementations, the "future state" may refer to a set of predicted states corresponding to the set of touchdown locations defined by a step path (e.g., the predicted state of the robot can be determined with reference to a particular touchdown location in the step path). In some cases, the "future state" may also include predicted states in between touchdown locations, such that the predicted state can be determined with reference to a particular point of time in the future. Regardless of the manner or time scale in which the future state is determined, the predicted future state or states of the robot may serve as a basis for generating a capture point trajectory.

In some implementations, the state of the robot received at block 704 includes both the current state of the robot and the future state or states of the robot. For example, a computing device separate from the robot may obtain the robot's current state and apply it to a model of the robot with the reference step path to predict the future state or states of the robot. Then, the current and/or future state may be provided to a device implementing operations 700.

In some instances, the state of the robot may be based on raw sensor information that indicates the state of specific components of the robot. As one example, the state of the robot may include a set of joint angles measured from the various joints of the robot. A control system or computing device may derive information from such measurements in order to determine high-level state information. For instance, based on joint angle measurements for a particular leg of the robot, a control system or computing device may determine the position of the robot's foot with respect to the robot's body based on known sizes and the configuration of that particular leg. These types of robotic state inferences may be performed to determine even higher-level state information (e.g., the position of one or more feet of the robot with respect to the robot's CoM).

In some cases, a sensor may incorporate circuitry or a computing device in order to translate the raw sensor readings into useful or pertinent state information. For example, an IMU coupled to the robot may include components for detecting acceleration. Some IMUs may incorporate circuitry or computing elements that integrate detected acceleration over time to determine velocity and/or position. Thus, sensor outputs may be processed information resulting from operations performed on the raw sensor data.

For the purposes of this application, the state of the robot may include any combination of raw sensor readings, sensor outputs, and/or information determine about the robot based on those sensor readings and outputs. Regardless of the type of information contained within the state of the robot, the state of the robot may include information from which aspects of the robot's model may be determined. For instance, the robot's CoP, CoM position, and/or CoM velocity may be derived from the state of the robot.

C. Generate a Reference Capture Point Trajectory

Block 706 involves generating a reference capture point trajectory. The reference capture point trajectory may include a set of capture points that represent stable CoP locations at various points along the reference step path. For a particular future point in time, a capture point's position may be calculated by applying the predicted future state at that point in time to a model of the robot. This process may be repeated for multiple future points in time to determine multiple capture points, which collectively form the capture point trajectory.

Figure 8:
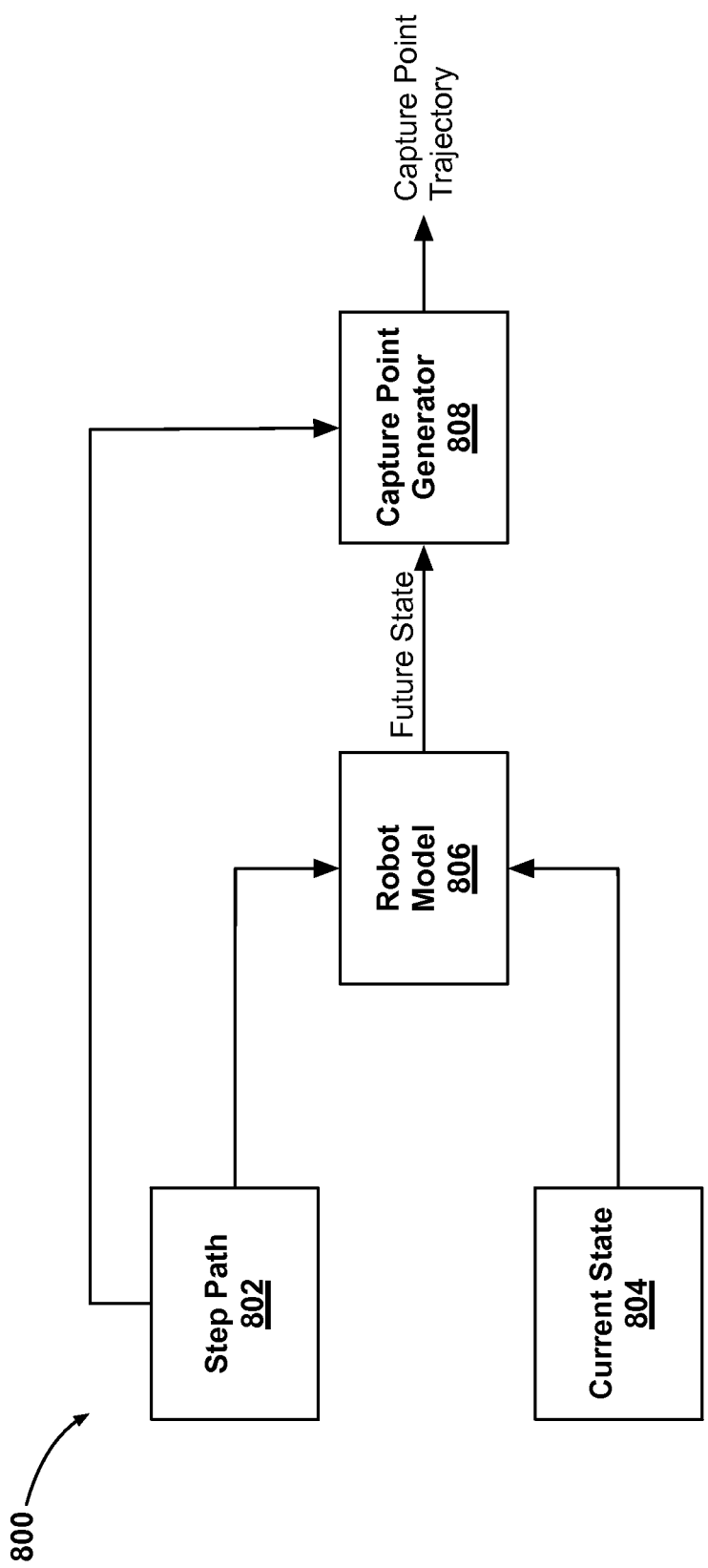
FIG. 8 is a schematic block diagram illustrating capture point trajectory generation, according to an example implementation.

Generating the reference capture point trajectory may involve determining predicted future states of the robot over a planned step path, and computing the capture point trajectory based on those future states and the planned step path. FIG. 8 shows a schematic block diagram 800 illustrating one technique for generating capture point trajectories. In the schematic block diagram 800, step path 802 and current state 804 may be applied to robot model 806. The step path 802 may be similar to or the same as the reference step path described above with respect to block 702. The current state 804 may be similar to the state of the robot described above with respect to block 704. The robot model 806 may be any robotic model as describe above (e.g., a LIP-based model of the robot). When the step path 802 and the current state 804 are applied to the robot model 806, a predicted future state (or states) of the robot may be determined.

The predicted future state of the robot may be based on the robot's dynamics, the robot's current state, and the reference step path. Future state prediction may also depend upon the particular control parameters of the robot's control system (which may define the robot's stepping behavior and/or gait). The future state of the robot may include the CoM position and the CoM velocity at one or more points in time in the future (e.g., at one or more touchdown moments in the step path), among other aspects of the robot's kinematics and/or dynamics.

One future state prediction technique may involve employing an open-loop LIP model that estimates the robot's CoP as the center of the robot's footprint (e.g., the average position of the robot's feet at a given point in time). Predicting the robot's future state using this center of footprint (CoF) method may then involve applying the robot's CoM position, CoM velocity, and CoF location (as the CoP in the LIP model) to the robot's model in order to determine how the robot's state changes for a given stance period.

However, approximating the robot's future state in this manner may be inaccurate in some scenarios, because the robot's virtual CoP may vary during a given stance period (that is, between touchdown and liftoff of a particular foot of the robot). Thus, while the robot's CoF may serve as a good approximation of the robot's CoP as a foot begins to swing forward, the CoP estimation using the CoF may be an unsatisfactory approximation as the foot moves closer to touchdown. This may result in inaccurate stepping control because the accuracy of future state predictions is significant at the moment before touchdown.

Another future state prediction technique may involve utilizing a complex model that more accurately represents the robot's CoP position during a given stance period. A robot may be configured to operate according to a step path, which corresponds to a capture point trajectory. During operation, the step path and capture point trajectory may be updated periodically. In these instances, the robot's CoP position may be more accurately estimated by taking into account the predicted behavior of the robot (e.g., the robot stepping at or near the planned capture points in order to accomplish a particular goal). In one example, the robot's CoP position may be estimated at a given point in time in the future based on a capture point from the currently planned capture point trajectory and other aspects of the robot's dynamics specified by the model of the robot.

After the predicted future state has been determined, the capture point generator 808 may generate, compute, calculate, or otherwise determine the capture point trajectory based on the future state and step path 802. An individual capture point may be determined based on the robot's CoM position, CoM velocity, and the tipping frequency of the LIP model of the robot, among other possible aspects of the robot's state or kinematic configuration.

The above-described two-step technique involving (i) predicting the robot's future state and (ii) determining the capture point trajectory may be combined into a single step. In some implementations, a relationship between the robot's current state and a step path may be used to generate the capture point trajectory without explicitly determining the robot's future state. Regardless of the particular implementation, block 706 involves generating the reference capture point trajectory as one or more spatial points on a surface that represent predicted stable CoP positions for the robot as it travels along a step path.

Note that, in some implementations, the reference capture point trajectory may be pre-determined or otherwise pre-computed on a device separate from the robot. For example, the robot may be interfaced with an external computing device, to which the robot transmits information (such as the robot's state) and from which the robot receives information (e.g., step paths, capture point trajectories, or any other kind of information). Such an external computing device may be configured to perform one or more of the operations 700 illustrated in FIG. 7.

D. Obtain at Least Two Potential Step Paths

Block 708 involves obtaining at least two potential step paths. A potential step path is a candidate set of footstep locations that may be selected to be carried out by the robot. A given potential step path may include any elements of a step path as described above. At the following block 710, each potential step path may be comparatively evaluated against the reference step path in order to determine the extent of similarity (or differences) between the two step paths.

The potential step paths may be determined in various ways. In some implementations, the potential step paths may be modified versions of the reference step path. In other implementations, a template or other predetermined stepping pattern may be applied based on the reference step path's trajectory to generate one or more potential step paths.

In further implementations, the trajectory of the reference step path may define footprint areas within which touchdown locations may be selected. A footprint area may be an area on the ground or a surface defined by the stepout range of the robot. In other words, if the robot's CoM is at a particular point along a trajectory, the footprint area may be a range of locations that the robot's feet are capable of reaching.

Another technique for determining potential step paths is to incrementally vary the touchdown locations of the reference step path to obtain slight variations of the reference step path. Using this technique, one or more potential step paths may be generated and evaluated to determine if a viable or satisfactory potential step path has been generated. If no operable or satisfactory potential step paths were generated, variations on those step paths may be generated and evaluated. This process may be repeated until a potential step path which satisfies some criterion or criteria has been determined.

In some instances, potential step paths may be generated to comply with the physical constraints of the robot. In these instances, evaluating the potential step paths may involve selecting one that is satisfactorily similar to the reference step path (among other possible criteria).

In some cases, the potential step paths may be generated without knowledge of whether the robot can physically carry out the potential step path. In these cases, evaluating the potential step path may involve first determining whether a given potential step path violates any physical constraints of the robot. Then, after the non-feasible potential step paths have been removed as candidates, the remaining feasible potential step paths may be evaluated and one may be selected that is satisfactorily similar to the reference step path (among other possible criteria). Some implementations may integrate constraint violation assessment and similar evaluation into a single step (e.g., assigning a large penalty to constraint violation and a small penalty to deviations from the reference step path).

Regardless of the particular manner in which potential step paths are generated, determined, or obtained, two or more potential step paths may be obtained, one of which may be selected for execution by the robot.

E. Select a Particular Step Path Based on a Relationship Between the at Least Two Potential Step Paths, the Potential Capture Point Trajectory, the Reference Step Path, and the Reference Capture Point Trajectory Block 710 involves selecting a particular step path of the at least two potential step paths. The selection may be based on a relationship between potential step paths, potential capture point trajectories, reference step paths, and reference capture point trajectories. Block 710 may involve determining a "score" value for each potential step path, and then selecting the particular step path based on the resulting scores. A score value may indicate the extent to which a potential step path and potential capture point trajectory deviates from the reference step path and the reference capture point trajectory. If a given score value is satisfactory or otherwise meets some criterion, the corresponding potential step path trajectory may be selected to be carried out by the robot.

The following description discloses one specific implementation for evaluating a potential step path to determine its score. Although the example below presents specific mathematical relationships, the relationships are provided for explanatory purposes. Other mathematical relationships, metrics, and manners of potential step path evaluation may be defined without departing from the scope of the present application.

Generally, the score value represents the extent to which a potential step path's touchdown positions and stability differs from the reference step path's foot positions and stability. The score value provides a numerical metric that can be compared with other score values (or a threshold score value) in order to determine which potential step path from among a set of potential step paths to carry out. Equation 1 below describes one way to calculate the score value for a potential step path.

$$\text{score} = \sum_{\text{all legs}} \int Q_r(\Delta_d(t) - \Delta(t))^2 + Q_p(p_d(t) - p(t)) dt \quad [1]$$

The following sections describes each portion of Equation 1 in more detail.

1. Foot Placement Error: $p_d(t)-p(t)$

A step path includes a set of footsteps. Each footstep may include a touchdown location (e.g., a two-dimensional position) and be associated with a particular leg. Thus, a given step path may contain multiple sets of footsteps, with each set being associated with one of the robot's legs.

A set of footsteps associated with a particular leg in a potential step path may be compared to another set of footsteps associated with that leg in the reference step path. Specifically, the respective touchdown locations in a potential step path and a reference step path may be compared.

Consider a touchdown location in the potential step path $p_d(t)$ and a corresponding touchdown location in the reference step path $p(t)$. A foot placement error for this particular touchdown location—which may be associated with a particular point in time t—may be determined as the difference between the potential touchdown location $p_d(t)$ and the reference touchdown location $p(t)$. Note that this foot placement error only represents the error for a single corresponding set of touchdown locations (or a single point in time). The foot placement error may represent the displacement between the potential touchdown location and corresponding reference touchdown location. In some cases, the displacement may be a distance between the (x, y) coordinate of the potential touchdown location and the (x, y) coordinate of the corresponding reference touchdown location.

Figure 9:
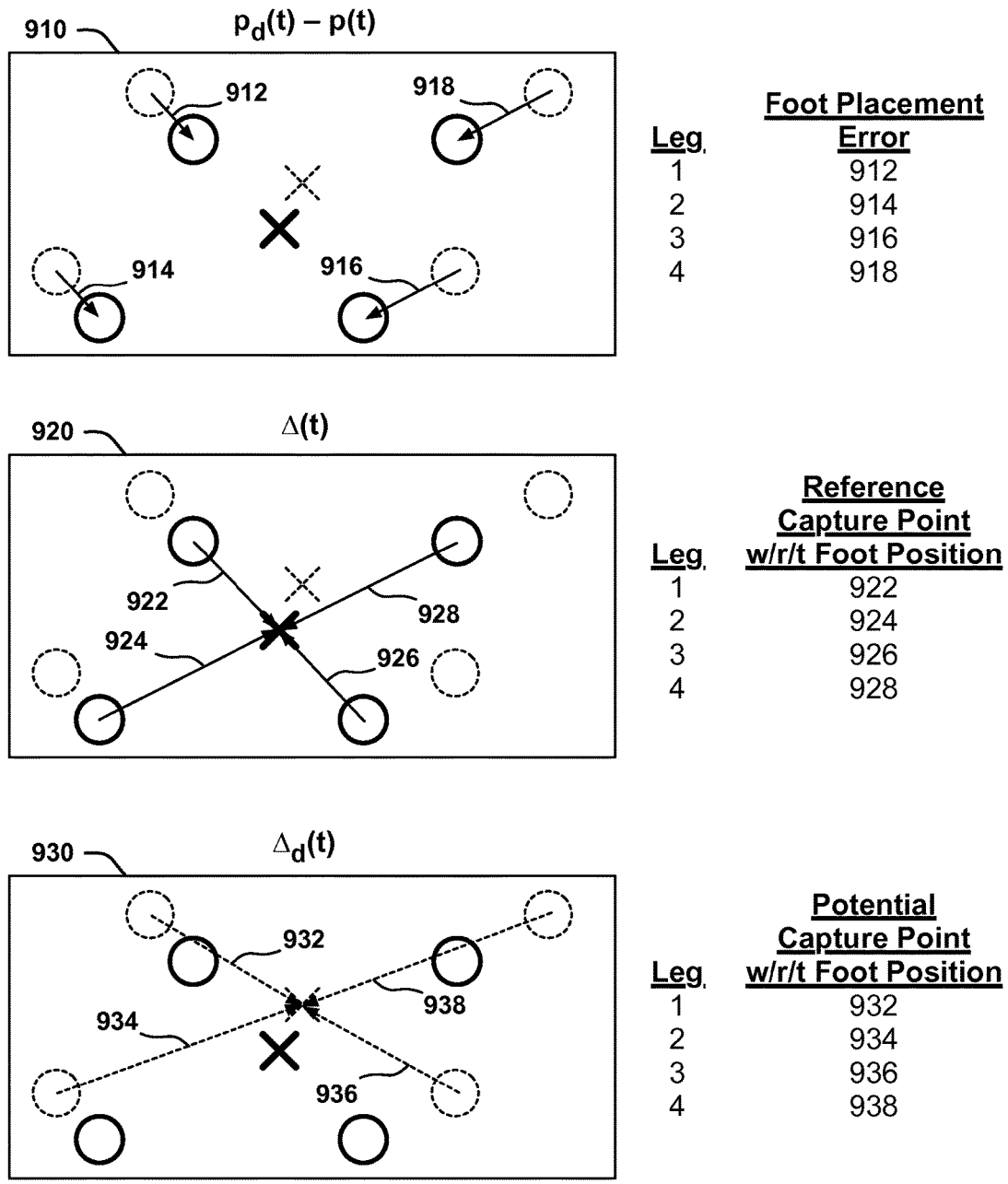
FIG. 9 illustrates metrics, according to an example implementation.

Frame 910 in FIG. 9 illustrates some example foot placement error measurements. FIG. 9 depicts conceptual top-down views comparing touchdown locations and capture point positions of a quadruped robot. In FIG. 9, the solid-lined circles represent a set of touchdown locations in a reference step path, while the dashed-lined circles represent a corresponding set of touchdown locations in a potential step path. Similarly, the solid-lined "X" represents a capture point position in the reference capture point trajectory, while the dashed-lined "X" represents a capture point position in the potential capture point trajectory.

Frame 910 depicts arrows drawn from the potential touchdown locations to the corresponding reference touchdown locations. Each arrow represents the foot placement error for that particular leg. For example, the foot placement error 912 for leg 1 is the difference between the potential touchdown location $p_d(t)$ and the reference touchdown location $p(t)$ for leg 1.

2. Capture Point Error: $\Delta_d(t)-\Delta(t)$

Equation 1 also involves determining a capture point error. Similarly to the step path having a set of footsteps, a capture point trajectory includes a set of capture point locations. For a particular point in time t (which may correspond to a touchdown location in a reference or potential step path), the capture point error may be calculated as a difference between (i) the potential capture point location with respect to the associated potential foot position $\Delta_d(t)$ and (ii) the reference capture point location with respect to the associated reference foot position $\Delta(t)$. One way to calculate the capture point location at a given point in time is shown in Equation 2:

$$\Delta(t) = x(t) + 1/\omega \dot{x}(t) - p(t) \quad [2]$$

Where $x(t)$ is the position of the robot's CoM, $\dot{x}(t)$ is the velocity of the robot's CoM, $\omega$ is the tipping frequency of the LIP model of the robot, and $p(t)$ is the position of a particular foot relative to the robot's CoM. Because the $p(t)$ term is included in Equation 2, the capture point's position $\Delta(t)$ is defined with respect to a particular foot position. Thus, the capture point error is not the difference in absolute capture point positions (e.g., in "world" coordinates), but instead is the difference in capture point positions relative to a particular foot position.

As stated above, capture point locations used to determine the capture point error are defined relative to their corresponding foot positions. This is because capture point location alone does not provide a clear indication as to the stability of the robot; however, the capture point's location relative to the robot's foot positions may signify how stable the robot is at a particular point in time. For example, a capture point that lies far outside of the robot's stance indicates that the robot may need to take a large step in order to stabilize itself. Conversely, a capture point that lies close to or within the robot's stance indicates that the robot may only have to perform small amounts of stepping in order to maintain stability.

Turning back to FIG. 9, Frames 920 and 930 illustrate how the capture point positions used to determine the capture point error may be measured. In frame 920, the arrows are drawn from the reference touchdown locations to the reference capture point location. Each arrow represents the reference capture point position with respect to a particular reference touchdown location. For example, the reference capture point position 922 is measured with respect to the reference touchdown position for leg 1.

In frame 930, the dashed arrows are drawn from the potential touchdown positions to the potential capture point location. Each arrow represents the potential capture point position with respect to a particular potential touchdown location. For example, the potential capture point position 932 is measured with respect to the potential touchdown position for leg 1.

Thus, for leg 1 as illustrated in FIG. 9, the capture point error is the difference between the potential capture point position 932 ($\Delta_d(t)$) and the reference capture point position 922 ($\Delta(t)$). The capture point error may also be referred to herein as the "capture point displacement value."

3. Squared Capture Point Error: $(\Delta_d(t)-\Delta(t))^2$

The capture point error may be squared (or exponentiated by a number other than 2). In some implementations, it may be desired to impose an exponential penalty on the level of instability in a potential step path and potential capture point trajectory. In this manner, increasingly unstable capture point trajectories produce exponentially larger capture point error values.

4. Foot Placement Error Weight $Q_p$ and Capture Point Error Weight $Q_r$

In some implementations, the foot placement error and/or the capture point error may be weighted. The weight values $Q_p$ and $Q_r$ may be set in order to bias the potential step path selection toward a certain goal. For example, a large foot placement error weight $Q_p$ and a smaller capture point error weight $Q_r$ may bias the potential step path selection toward step paths whose touchdown locations are close to those in the reference step path. This is because the deviations between a potential step path's touchdown locations and the reference step path's touchdown locations are amplified by the large foot placement error weight $Q_p$.

Conversely, a large capture point error weight $Q_r$ and a smaller foot placement error weight $Q_p$ may bias the potential step path selection toward step paths whose capture point locations are similar to those associated with the reference step path. Thus, the step path selection may exhibit varying degrees of bias towards foot step accuracy and/or stability, depending on how the weight values $Q_p$ and $Q_r$ are set.

In some instances, the reference capture point trajectory may represent a stable set of capture point locations with respect to the touchdown locations in the reference step path. Thus, in these instances, the reference capture point trajectory may serve as a reference of stability against which potential capture point trajectories may be compared to determine the stability of those potential step paths.

In some implementations, the weight values may be modified, updated, or otherwise altered during operation. For example, a robot may encounter a situation that demands accurate foot steps at the possible cost of stability (e.g., walking along a narrow bridge). As another example, the robot may be utilized for a specific purpose that demands a stable body position at the possible cost of foot step accuracy (e.g., carrying a fragile payload).

5. Combined Error: $Q_r(\Delta_d(t)-\Delta(t))^2+Q_p(p_d(t)-p(t))$

After the foot placement error and the capture point error have been weighted, scaled, exponentiated, or otherwise altered, they may be summed up to form a combined error. The combined error may represent a combination (or a weighted combination) of the foot placement error and the capture point error for a particular leg corresponding to a particular touchdown location (or a particular point in time t).

6. Aggregate Combined Error: $\int Q_r(\Delta_d(t)-\Delta(t))^2+Q_p(p_d(t)-p(t))dt$ The combined error may be determined for each touchdown location (or for all points in time t) in the potential step path and the reference step path. In some instances, the combined error value may be calculated for each touchdown location in the potential step path. Then, the combined error values may be summed up to determine an aggregate combined error. In other instances, the combined error value may be calculated for each point in time t in the potential step path (integrating over time from the first footstep to the last footstep in the potential step path). Regardless of whether the combined errors are determined based on time or based on touchdown locations, each of the combined errors may be aggregated to form the aggregate combined error for a particular leg over the entire potential step path.

7. Score: $\Sigma_{all\ legs}\int Q_r(\Delta_d(t)-\Delta(t))^2+Q_p(p_d(t)-p(t))dt$ An aggregate combined error may be determined for each of the robot's legs. The aggregate combined errors for all of the robot's legs may be added up to determine the overall score. As illustrated in the above description, Equation 1, and FIG. 9, the score provides a numerical representation of the degree of similarity between a reference step path and capture point trajectory and a potential step path and capture point trajectory. The manner in which the score is determined may be tuned to influence the step path selection and place priorities on certain control goals, such as stability or foot step accuracy.

Then, block 710 may involve selecting a particular step path from among the at least two potential step paths based on the determined scores. For example, the particular step path may be selected as the potential step path associated with the lowest score. In some implementations, the lowest score may be indicative of a potential step path from among the at least two potential step paths that minimizes the combination of foot placement errors and capture point errors. As another example, the particular step path may be selected as the potential step path associated with a score that is below a threshold score. In some implementations, a subset of the potential step paths may be evaluated and their scores may be compared against a threshold score to determine if one of those potential step paths is associated with a satisfactory score. The potential step path selection may be performed in this manner to reduce computational complexity. Regardless of the particular criterion or criteria for selecting the potential step path, block 710 involves selecting a potential step path on the basis of one or more of the calculated scores.

F. Instruct the Robot to Begin Stepping in Accordance with the Particular Step Path Block 712 involves instructing the robot to begin stepping in accordance with the particular step path. Instructing the robot may involve providing a control system of the robot with the stepping locations and parameters, along with a command to direct the robot to begin stepping in accordance with the newly provided step path. Instructing the robot may involve modifying other aspects of the robot's control systems, such as the parameters of the particular controller used by the robot.

In some implementations, instructing the robot involves causing a foot of the robot to starting moving toward the first touchdown location within the selected potential step path. Depending on the particular circumstances, that foot may or may not arrive at the first touchdown location before receiving different instructions. Additionally, due to external influences acting on the robot and/or the robot's environment, the foot may or may not land exactly at the touchdown location specified by the selected potential step path. Further, other planning and/or control system of the robot may alter the touchdown locations, depending upon the particular scenario. For example, the robot may be configured to avoid obstacles along its step path. In this example, instructing the robot to begin stepping in accordance with the selected step path may involve informing a planning and/or control system of the selected step path, which then observes the environment to ensure that the selected step path can indeed be carried out.

Note that the robot might or might not execute the selected step path to completion. In some instances, a control system implementing the step path determination techniques of the present application may perform the step path determination periodically, such that the resulting step path is updated regularly. In some implementations, the step path determination may occur multiple times before a given foot makes contact with the ground. Thus, instructing the robot to begin stepping in accordance with the particular step path may involve influencing the robot's movement based on the selected step path, even though the selected step path may be modified or replaced by another step path before the robot's foot even completes its first step.

VI. EXAMPLE COMPUTER-READABLE MEDIUM

Figure 10:
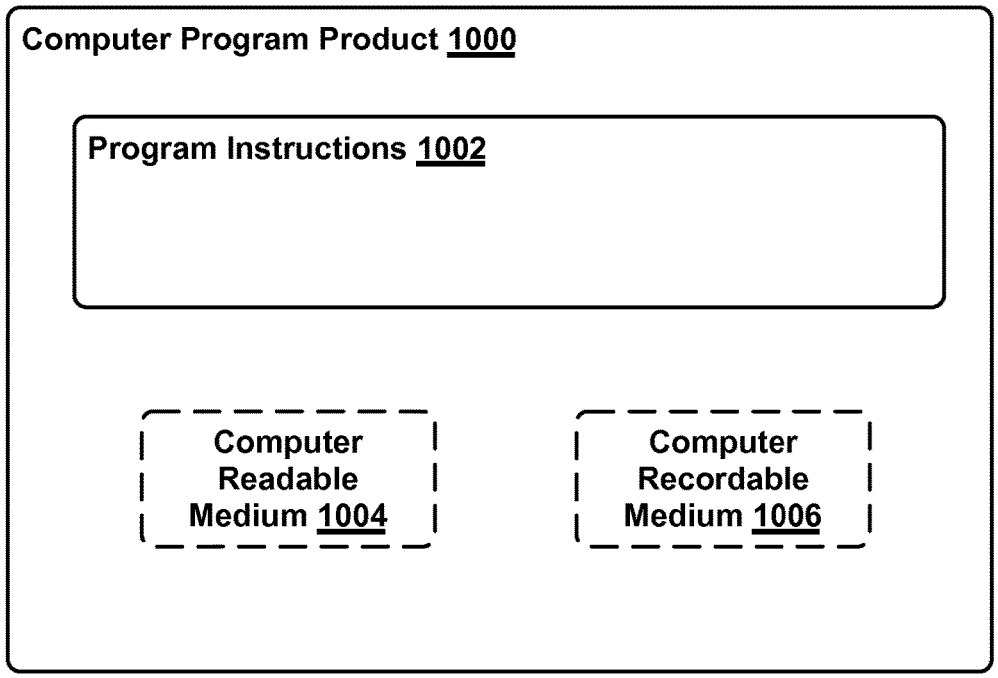
FIG. 10 is a block diagram of a computer-readable medium, according to an example implementation.

FIG. 10 illustrates an example computer-readable medium configured according to at least some implementations described herein. In example implementations, the example system can include one or more processors, one or more forms of memory, one or more input devices/interfaces, one or more output devices/interfaces, and machine readable instructions that when executed by the one or more processors cause a robotic device to carry out the various operations, tasks, capabilities, etc., described above.

As noted above, the disclosed procedures can be implemented by computer program instructions encoded on a computer-readable storage medium in a machine-readable format, or on other media or articles of manufacture. FIG. 10 is a schematic illustrating a conceptual partial view of a computer program product that includes a computer program for executing a computer process on a computing device, arranged according to at least some implementations disclosed herein.

In some implementations, the example computer program product 1000 may include one or more program instructions 1002 that, when executed by one or more processors may provide functionality or portions of the functionality described above with respect to FIGS. 1-9. In some examples, the computer program product 1000 may include a computer-readable medium 1004, such as, but not limited to, a hard disk drive, a Compact Disc (CD), a Digital Video Disk (DVD), a digital tape, memory, etc. In some implementations, the computer program product 1000 may include a computer recordable medium 1006, such as, but not limited to, memory, read/write (R/W) CDs, R/W DVDs, etc.

The one or more program instructions 1002 can be, for example, computer executable and/or logic implemented instructions. In some examples, a computing device is configured to provide various operations, or actions in response to the program instructions 1002 conveyed to the computing device by the computer readable medium 1004 and/or the computer recordable medium 1006. In other examples, the computing device can be an external device in communication with a device coupled to the robotic device.

The computer readable medium 1004 can also be distributed among multiple data storage elements, which could be remotely located from each other. The computing device that executes some or all of the stored instructions could be an external computer, or a mobile computing platform, such as a smartphone, tablet device, personal computer, a robot, or a wearable device, among others. Alternatively, the computing device that executes some or all of the stored instructions could be a remotely located computer system, such as a server. For example, the computer program product 1000 can implement operations discussed in reference to FIGS. 1-9.

VII. CONCLUSION

It should be understood that arrangements described herein are for purposes of example only. As such, other arrangements and other elements (e.g. machines, interfaces, operations, orders, and groupings of operations, etc.) can be used instead, and some elements may be omitted altogether. Further, many of the elements that are described may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A method comprising:
   obtaining a reference step path for a robot with at least three feet, wherein the reference step path includes a set of spatial points on a surface that define respective target touchdown locations for the at least three feet;
   receiving a state of the robot, wherein the state includes a position of the robot, a velocity of the robot, and respective positions of the at least three feet of the robot;
   based on the reference step path and the state of the robot, generating a reference capture point trajectory, wherein the reference capture point trajectory defines a predicted path that a center of pressure of the robot would travel along provided that the robot stepped in accordance with the reference step path;
   based on the reference step path, generating, by a controller of the robot, at least two potential step paths for the robot and a corresponding potential capture point trajectory;
   selecting a particular step path of the at least two potential step paths based on a relationship between the at least two potential step paths, the potential capture point trajectory, the reference step path, and the reference capture point trajectory, wherein selecting the particular step path comprises: (i) determining at least two combined error values based on combinations of respective corresponding step path errors between the at least two potential step paths and the reference step path, and a capture point trajectory error between the potential capture point trajectory and the reference capture point trajectory, and (ii) selecting, as the particular step path, the potential step path corresponding to a particular combined error value of the at least two combined error values that is a smallest combined error value or is below a threshold error value; and
   instructing the robot to begin stepping in accordance with the particular step path, wherein the robot, in response to the instructing, begins moving a foot of the robot toward a touchdown location of the particular step path.

2. The method of claim 1, wherein determining a given step path error comprises:
   multiplying a difference between a potential step path and the reference step path by a step path weight value.

3. The method of claim 2, further comprising:
   selecting the step path weight value from a plurality of step path weight values, wherein each step path weight value of the plurality of step path weight values corresponds to a particular stepping behavior.

4. The method of claim 1, wherein determining the capture point trajectory error comprises:
squaring a difference between the potential capture point trajectory and the reference capture point trajectory to determine a squared capture point trajectory error; and
multiplying the squared capture point trajectory error by a capture point trajectory weight value.

5. The method of claim 4, further comprising:
selecting the capture point trajectory weight value from a plurality of capture point trajectory weight values, wherein each capture point trajectory weight value of the plurality of capture point trajectory weight values corresponds to a particular stepping behavior.

6. The method of claim 1, wherein the reference capture point trajectory includes reference capture point locations, wherein the potential capture point trajectory includes potential capture points locations, wherein each reference capture point location corresponds to a particular potential capture point location, and wherein determining the capture point trajectory error comprises:
determining relative potential capture point locations as differences between the potential capture point locations and corresponding spatial points for a particular leg of the at least three legs of the robot defined by the corresponding potential step path;
determining relative reference capture point locations as differences between the reference capture point locations and corresponding spatial points for the particular leg defined by the reference step path;
determining capture point displacement values as differences between the relative potential capture point locations and the respective relative reference capture point locations; and
determining the capture point trajectory error as a sum of the capture point displacement values.

7. The method of claim 1, wherein determining a given step path error comprises:
obtaining one or more constraints indicative of physical limitations of the robot;
determining that the potential step path corresponding to the particular combined error value does not violate the one or more constraints; and
selecting, as the particular step path, the potential step path corresponding to the particular combined error value.

8. The method of claim 1, wherein generating the reference capture point trajectory comprises:
for the set of spatial points, determining corresponding capture points as linear combinations of (i) the position of the robot, (ii) the velocity of the robot, and (iii) the respective position of one of the at least three feet of the robot; and
determining the reference capture point trajectory as a combination of the determined capture points.

9. The method of claim 1, wherein generating the reference capture point trajectory comprises:
obtaining a model of the robot, wherein the model indicates a manner in which the robot is expected to move when stepping in accordance with a given step path; and
based on the reference step path, the state of the robot, and the model of the robot, determining a predicted future state of the robot; and
based on the predicted future state of the robot and the reference step path, generating the reference capture point trajectory.

10. The method of claim 1, further comprising:
receiving an input steering command indicative of a desired velocity and yaw; and
generating the reference step path based on the input steering command.

11. The method of claim 1, further comprising:
after a length of time from instructing the robot to begin stepping in accordance with the particular step path, performing steps of (i) obtaining a second reference step path, (ii) receiving a second state of the robot, (iii) generating a second reference capture point trajectory, (iv) obtaining at least two additional potential step paths for the robot and a second corresponding potential capture point trajectory, (v) selecting a second particular potential step path, and (vi) instructing the robot to begin stepping in accordance with the second particular step path.

12. A non-transitory computer-readable medium having instructions stored thereon that, upon execution by at least one processor, causes a robot to perform operations comprising:
obtaining a reference step path for the robot with at least three feet, wherein the reference step path includes a set of spatial points on a surface that define respective target touchdown locations for at least a first foot, a second foot, and a third foot of the robot;
receiving a state of the robot, wherein the state includes a position of the robot, a velocity of the robot, and respective positions of the at least three feet of the robot;
based on the reference step path and the state of the robot, generating a reference capture point trajectory, wherein the reference capture point trajectory defines a predicted path that a center of pressure of the robot would travel along provided that the robot stepped in accordance with the reference step path;
based on the reference step path, generating at least two potential step paths for the robot and a corresponding potential capture point trajectory;
selecting a particular step path of the at least two potential step paths based on a relationship between the at least two potential step paths, the potential capture point trajectory, the reference step path, and the reference capture point trajectory, wherein selecting the particular step path comprises: (i) determining at least two combined error values based on combinations of respective corresponding step path errors between the at least two potential step paths and the reference step path, and a capture point trajectory error between the potential capture point trajectory and the reference capture point trajectory, and (ii) selecting, as the particular step path, the potential step path corresponding to a particular combined error value of the at least two combined error values that is a smallest combined error value or is below a threshold error value; and
instructing the robot to begin stepping in accordance with the particular step path, wherein the robot, in response to the instructing, begins moving a foot of the robot toward a touchdown location of the particular step path.

13. The non-transitory computer-readable medium of claim 12, wherein determining a given step path error comprises:
multiplying a difference between a potential step path and the reference step path by a step path weight value.

14. The non-transitory computer-readable medium of claim 12, wherein determining the capture point trajectory error comprises:

squaring a difference between the corresponding potential capture point trajectory and the reference capture point trajectory to determine a squared capture point trajectory error; and multiplying the squared capture point trajectory error by a capture point trajectory weight value.

15. A robot comprising:

at least three feet; and a control system configured to perform operations comprising:

obtaining a reference step path for the robot, wherein the reference step path includes a set of spatial points on a surface that define respective target touchdown locations for the at least three feet;

receiving a state of the robot, wherein the state includes a position of the robot, a velocity of the robot, and respective positions of the at least three feet of the robot;

based on the reference step path and the state of the robot, generating a reference capture point trajectory, wherein the reference capture point trajectory defines a predicted path that a center of pressure of the robot would travel along provided that the robot stepped in accordance with the reference step path;

based on the reference step path, generating at least two potential step paths for the robot and a corresponding potential capture point trajectory;

selecting a particular step path of the at least two potential step paths based on a relationship between the at least two potential step paths, the potential capture point trajectory, the reference step path, and the reference capture point trajectory, wherein selecting the particular step path comprises: (i) determining at least two combined error values based on combinations of respective corresponding step path errors between the at least two potential step paths and the reference step path, and a capture point trajectory error between the potential capture point trajectory and the reference capture point trajectory, and (ii) selecting, as the particular step path, the potential step path corresponding to a particular combined error value of the at least two combined error values that is a smallest combined error value or is below a threshold error value; and instructing the robot to begin stepping in accordance with the particular step path, wherein the robot, in response to the instructing, begins moving a foot of the robot toward a touchdown location of the particular step path.

16. The robot of claim 15, wherein generating the reference capture point trajectory comprises:

obtaining a model of the robot, wherein the model indicates a manner in which the robot is expected to move when stepping in accordance with a given step path; and based on the reference step path, the state of the robot, and the model of the robot, determining a predicted future state of the robot; and based on the predicted future state of the robot and the reference step path, generating the reference capture point trajectory.

17. The method of claim 15, wherein determining a given step path error comprises:

obtaining one or more constraints indicative of physical limitations of the robot;

determining that the potential step path corresponding to the particular combined error value does not violate the one or more constraints; and selecting, as the particular step path, the potential step path corresponding to the particular combined error value.

* * * * *